United States Patent
Spalt et al.

(10) Patent No.: US 11,709,470 B2
(45) Date of Patent: *Jul. 25, 2023

(54) UTILITY GRID CONTROL USING A DYNAMIC POWER FLOW MODEL

(71) Applicant: Utilidata, Inc., Providence, RI (US)

(72) Inventors: Taylor Spalt, Providence, RI (US); Ning Li, Mansfield, MA (US); Marissa Hummon, Golden, CO (US); Lobsang Lama, Providence, RI (US)

(73) Assignee: Utilidata, Inc., Providence, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/401,608

(22) Filed: Aug. 13, 2021

(65) Prior Publication Data

US 2021/0373518 A1 Dec. 2, 2021

Related U.S. Application Data

(63) Continuation of application No. 16/526,465, filed on Jul. 30, 2019, now Pat. No. 11,099,537.

(Continued)

(51) Int. Cl.
*G05B 19/042* (2006.01)
*G06F 17/18* (2006.01)
(Continued)

(52) U.S. Cl.
CPC .......... *G05B 19/042* (2013.01); *G06F 17/18* (2013.01); *G06N 20/00* (2019.01); *G06Q 50/06* (2013.01); *G05B 2219/2639* (2013.01)

(58) Field of Classification Search
CPC .......... G05B 19/042; G05B 2219/2639; G06Q 50/06; G06F 17/18; G06N 20/00
(Continued)

(56) References Cited

U.S. PATENT DOCUMENTS 5,970,103 A 10/1999 Townshend
7,179,270 B2 2/2007 Makower
(Continued)

FOREIGN PATENT DOCUMENTS

JP 2019-091124 A 6/2019
WO WO-2020/160427 A1 8/2020

OTHER PUBLICATIONS

ABB Network Manager EMS (https://www.hitachiabb-powergrids.com/offering/product-and-system/scada/network-management/abb-ability-network-manager-ems).
(Continued)

*Primary Examiner* — Jigneshkumar C Patel
(74) *Attorney, Agent, or Firm* — Foley & Lardner LLP

(57) ABSTRACT

Systems and methods are directed controlling components of a utility grid. The system can receive signals. The system can determine one or more statistical metrics based on the signals. The system can generate an input matrix. The system can input the input matrix into a machine learning model. The system can predict, based on the input matrix and via the machine learning model, the value for the signal of the utility grid at a time period for which the value is not provided in the input matrix. The system can provide a command to control a component of the utility grid responsive to the value for the signal of the utility grid predicted by the machine learning model.

20 Claims, 5 Drawing Sheets

Related U.S. Application Data

(60) Provisional application No. 62/868,594, filed on Jun. 28, 2019.

(51) Int. Cl.
   *G06Q 50/06* (2012.01)
   *G06N 20/00* (2019.01)

(58) Field of Classification Search
   USPC .......................................................... 700/295
   See application file for complete search history.

(56) References Cited

U.S. PATENT DOCUMENTS

| | | |
|---|---|---|
| 8,437,883 B2 | 5/2013 | Powell et al. |
| 8,577,510 B2 | 11/2013 | Powell et al. |
| 11,334,036 B2 | 5/2022 | Yang et al. |
| 2002/0110280 A1 | 8/2002 | Prakash et al. |
| 2008/0243067 A1 | 10/2008 | Rottenberg et al. |
| 2008/0249397 A1 | 10/2008 | Kapadia |
| 2009/0088685 A1 | 4/2009 | Kugler et al. |
| 2009/0124899 A1 | 5/2009 | Jacobs et al. |
| 2010/0063534 A1 | 3/2010 | Kugler et al. |
| 2012/0296482 A1 | 11/2012 | Steven et al. |
| 2012/0316697 A1 | 12/2012 | Boardman et al. |
| 2013/0166084 A1 | 6/2013 | Sedighy et al. |
| 2013/0232094 A1* | 9/2013 | Anderson .......... G05B 23/0281 706/12 |
| 2013/0289772 A1 | 10/2013 | Friedrich et al. |
| 2014/0265574 A1 | 9/2014 | Tyler et al. |
| 2014/0277796 A1 | 9/2014 | Peskin et al. |
| 2014/0277813 A1 | 9/2014 | Powell et al. |
| 2014/0277814 A1 | 9/2014 | Hall et al. |
| 2014/0312693 A2 | 10/2014 | Powell et al. |
| 2015/0100172 A1 | 4/2015 | Forbes, Jr. |
| 2015/0248510 A1 | 9/2015 | Meagher et al. |
| 2016/0343093 A1 | 11/2016 | Riland et al. |
| 2018/0100911 A1 | 4/2018 | Bell |
| 2019/0324411 A1 | 10/2019 | Vanhoudt et al. |
| 2020/0073342 A1 | 3/2020 | Lee et al. |
| 2020/0136392 A1 | 4/2020 | Murugesan et al. |
| 2020/0409323 A1 | 12/2020 | Spalt et al. |

OTHER PUBLICATIONS

Bernstein, A., & Dall'Anese, E. (2019). Real-time feedback-based optimization of distribution grids: A unified approach. IEEE Transactions on Control of Network Systems, 6(3), 1197-1209.

Chen, Y., Shi, Y., & Zhang, B. (2020). Data-Driven Optimal Voltage Regulation Using Input Convex Neural Networks. Electric Power Systems Research, 189, 106741.

CYME Optimal Power Flow (http://www.cyme.com/software/cymopf/).

ETAP (https://etap.com/product/optimal-power-flow-software).

European Extended Search Report on EP Appln 22161138.7 dated Aug. 4, 2022.

Fioretto, F., Mak, T. W., & Van Hentenryck, P. (Apr. 2020). Predicting AC optimal power flows: Combining deep learning and lagrangian dual methods. In Proceedings of the AAAI Conference on Artificial Intelligence (vol. 34, No. 01, pp. 630-637).

Foucquier et al., "State of the art in building modelling and energy performances prediction: A review," Elsevier, 2013, 17pg. (Year: 2013).

Hsu, Y. Y., & Lu, F. C. (1998). A combined artificial neural network-fuzzy dynamic programming approach to reactive power/voltage control in a distribution substation. IEEE Transactions on Power Systems, 13(4), 1265-1271.

International Preliminary Report on Patentability on PCT Appln. PCT/US2020/039873 dated Jan. 6, 2022.

International Search Report and Written Opinion on PCT PCT/US2020/039873 dated Sep. 17, 2020.

Isaacson, Jerry, Ph.D. et al., "Ignyta, Inc.: Initiation of Coverage," LifeSci Advisors Research, Feb. 14, 2014, pp. 1-37.

J. Cardona, T. Gill, and S. Powell, "CS229: Machine Learning Models for Inverse Power Flow in the Grid". CS229 Final Report (2017).

Japanese Examination Report on JP appln. 2021-566941 dated Jun. 21, 2022.

Li et al., "Residential Household Non-Intrusive Load Monitoring via Graph-Based Multi-Label Semi-Supervised Learning," IEEE, 2019, 13pg. (Year: 2019).

Notice of Allowance on U.S. Appl. No. 16/526,465 dated Apr. 15, 2021.

Notice of Allowance on U.S. Appl. No. 17/200,367 dated Jun. 2, 2022.

Pourjafari, E., & Reformat, M. (2019). A Support Vector Regression Based Model Predictive Control for Volt-Var Optimization of Distribution Systems. IEEE Access, 7, 93352-93363.

R. Sevlian et al., "Vader: Visualization and analytics for distributed energy resources". arXiv preprint arXiv:1708.09473 (2017).

Raza et al., "Application of signal processing techniques for islanding detection of distributed generation in distribution network: A review," Elsevier, 2015, 12pg. (Year: 2015).

Singh, M. K., Gupta, S., Kekatos, V., Cavraro, G., & Bernstein, A. (2020). Learning to Optimize Power Distribution Grids using Sensitivity-Informed Deep Neural Networks. arXiv preprint arXiv:2007.03728.

U.S. Office Action on U.S. Appl. No. 16/526,465 dated Jan. 8, 2021.

Zamzam, A., & Baker, K. (2019). Learning optimal solutions for extremely fast ac optimal power flow. arXiv preprint arXiv:1910.01213.

Zor et al., "A State-of-the-Art Review of Artificial Intelligence Techniques for Short-Term Electric Load Forecasting," IEEE, 2017,7 pg. (Year: 2017).

Australian Examination Report on AU Appl. Ser. No. 2020308011 dated Oct. 10, 2022 (3 pages).

US Notice of Allowance on U.S. Appl. No. 17/200,367 dated Sep. 23, 2022 (7 pages).

* cited by examiner

UTILITY GRID CONTROL USING A DYNAMIC POWER FLOW MODEL

CROSS-REFERENCES TO RELATED APPLICATIONS

This application claims the benefit of priority under 35 U.S.C. § 120 as a continuation of U.S. Non-Provisional patent application Ser. No. 16/526,465, filed Jul. 30, 2019, which claims the benefit of priority under 35 U.S.C. § 119 to U.S. Provisional Patent Application No. 62/868,594, filed Jun. 28, 2019, each of which is hereby incorporated by reference herein in its entirety.

FIELD OF THE DISCLOSURE

This disclosure relates generally to systems and methods for controlling a utility grid using a dynamic power flow model. In particular, the systems and methods of this disclosure can control components on a utility grade based on a data-driven, real-time, dynamic power flow model.

BACKGROUND

Utility distribution grids can use meters to observe or measure utility delivery or consumption in the grid. The utility distribution grid can include numerous connection points and components. However, it may be challenging to evaluate characteristics of utility supply or consumption in order to maintain efficient and reliable utility distribution throughout the utility grid.

BRIEF SUMMARY OF THE DISCLOSURE

Systems and methods of the present disclosure are directed to controlling a utility grid using a dynamic power flow model. The systems and methods of this disclosure can control components on a utility grade based on a data-driven, real-time, dynamic power flow model. For example, a system can receive signals from components of the utility grid, clean and filter the signals. The system can use a machine learning model to predict a value for the utility grid based on the input signals, and then control, manage, or otherwise maintain the utility grid.

At least one aspect of the present disclosure is directed to a method of controlling components of a utility grid. The method can include a data processing system identifying a first plurality of signals detected by one or more devices located at one or more portions of a utility grid. The method can include identifying a second plurality of signals received from a server remote from the utility grid. The method can include determining one or more statistical metrics based on the first plurality of signals and the second plurality of signals. The method can include generating an input matrix. The input matrix can have a first dimension corresponding to timestamps. The input matrix can have a second dimension corresponding to the first plurality of signals, the second plurality of signals, and the one or more statistical metrics. The method can include the data processing system inputting the input matrix into a machine learning model. The machine learning model can be constructed to output a value for a signal of the utility grid based on the input matrix. The method can include the data processing system predicting, based on the input matrix and via the machine learning model, the value for the signal of the utility grid at a time period for which the value is not provided in the input matrix. The method can include the data processing system providing a command to control a component of the utility grid responsive to the value for the signal of the utility grid predicted by the machine learning model.

The first plurality of signals can include substation signals, primary circuit signals or secondary circuit signals. Substation signals can correspond to at least one of a voltage regulator, a load tap changer, a substation meter, a digital relay, or a circuit breaker. The primary circuit signals can correspond to at least one of a primary circuit meter, capacitor bank, primary circuit voltage regulator, line voltage monitor, primary solar inverter. Secondary circuit signals can correspond to at least one of a secondary solar inverter, an electric vehicle charging point, a residential electric meter, or data from an electronic device located at a customer location. The second plurality of signals can include at least one of current weather, forecasted weather, current transmission, forecasted transmission, price signals, or distribution capacity.

The method can include the data processing system determining that a sampling rate for a first signal of the first plurality of signals is different from a sampling rate for a second signal of the first plurality of signals. The data processing system synchronizes the first signal with the second signal. The data processing system can clean the first plurality of signals to remove time periods corrupted by noise or comprising null values.

The method can include the data processing system detecting that one or more samples of at least one signal of the first plurality of signals is corrupted by noise or includes null values. The data processing system can clean the first plurality of signals by removing samples from each signal in the first plurality of signals corresponding to timestamps of the one or more samples of the at least one signal that is corrupted by noise or includes null values.

The method can include the data processing system selecting, based on at least one of a sampling rate of the first plurality of signals or a smoothness parameter, a filter. The data processing system can apply the selected filter to the first plurality of signals to generate filtered data. The data processing system can generate the input matrix using the filtered data. The smoothness parameter is set to maintain underlying trends in the first plurality of signals.

The method can include the data processing system training the machine learning model using a historical input matrix generated from historical signals and historical statistical metrics. The data processing system can apply one or more weights to a dimension of the historical input matrix to adjust an impact values of the dimension have on the machine learning model.

The method can include the data processing system comparing the value for the signal of the utility grid predicted by the machine learning model with a threshold. The data processing system can generate the command to control the component based on the comparison.

The method can include the data processing system predicting, via the input matrix and the machine learning model, a plurality of changes to a plurality of signals associated with a plurality of components of the utility grid. The data processing system can evaluate the plurality of changes to identify a desired outcome for the utility grid. The data processing system can generate one or more commands to control one or more of the plurality of components to achieve the desired outcome for the utility grid.

The method can include the data processing system receiving, subsequent to controlling the component with the command, a third plurality of signals detected by the one or more devices located at the one or more portions of the utility grid. The data processing system can update the machine learning model based on the command and the third plurality of signals.

At least one aspect is directed to a system to control components of a utility grid. The system can include one or more processors. The one or more processors can identify a first plurality of signals detected by one or more devices located at one or more portions of a utility grid, and a second plurality of signals received from a server remote from the utility grid. The one or more processors can determine one or more statistical metrics based on the first plurality of signals and the second plurality of signals. The one or more processors can generate an input matrix having a first dimension corresponding to timestamps, and a second dimension corresponding to the first plurality of signals, the second plurality of signals, and the one or more statistical metrics. The one or more processors can input the input matrix into a machine learning model constructed to output a value for a signal of the utility grid based on the input matrix. The one or more processors can predict, based on the input matrix and via the machine learning model, the value for the signal of the utility grid at a time period for which the value is not provided in the input matrix. The one or more processors can provide a command to control a component of the utility grid responsive to the value for the signal of the utility grid predicted by the machine learning model.

The first plurality of signals can include substation signals, primary circuit signals or secondary circuit signals. Substation signals can correspond to at least one of a voltage regulator, a load tap changer, a substation meter, a digital relay, or a circuit breaker. The primary circuit signals can correspond to at least one of a primary circuit meter, capacitor bank, primary circuit voltage regulator, line voltage monitor, primary solar inverter. Secondary circuit signals can correspond to at least one of a secondary solar inverter, an electric vehicle charging point, a residential electric meter, or data from an electronic device located at a customer location. The second plurality of signals can include at least one of current weather, forecasted weather, current transmission, forecasted transmission, price signals, or distribution capacity.

In some embodiments, the one or more processors can determine that a sampling rate for a first signal of the first plurality of signals is different from a sampling rate for a second signal of the first plurality of signals. The one or more processors can synchronize the first signal with the second signal prior to cleaning the first plurality of signals. The one or more processors can clean the first plurality of signals to remove time periods corrupted by noise or comprising null values.

The one or more processors can detect that one or more samples of at least one signal of the first plurality of signals is corrupted by noise or includes null values. The one or more processors can clean the first plurality of signals by removing samples from each signal in the first plurality of signals corresponding to timestamps of the one or more samples of the at least one signal that is corrupted by noise or includes null values.

The one or more processors can select, based on at least one of a sampling rate of the first plurality of signals or a smoothness parameter, a filter. The one or more processors can apply the selected filter to the first plurality of signals to generate filtered data. The one or more processors can generate the input matrix using the filtered data. The smoothness parameter is set to maintain underlying trends in the first plurality of signals.

The one or more processors can train the machine learning model using a historical input matrix generated from historical signals and historical statistical metrics. The one or more processors can apply one or more weights to a dimension of the historical input matrix to adjust an impact values of the dimension have on the machine learning model.

The one or more processors can compare the value for the signal of the utility grid predicted by the machine learning model with a threshold. The one or more processors can generate the command to control the component based on the comparison.

The one or more processors can predict, via the input matrix and the machine learning model, a plurality of changes to a plurality of signals associated with a plurality of components of the utility grid. The one or more processors can evaluate the plurality of changes to identify a desired outcome for the utility grid. The one or more processors can generate one or more commands to control one or more of the plurality of components to achieve the desired outcome for the utility grid.

The one or more processors can receive, subsequent to controlling the component with the command, a third plurality of signals detected by the one or more devices located at the one or more portions of the utility grid. The one or more processors can update the machine learning model based on the command and the third plurality of signals.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE FIGURES

The accompanying drawings are not intended to be drawn to scale. Like reference numbers and designations in the various drawings indicate like elements having similar structure or functionality. For purposes of clarity, not every component may be labeled in every drawing. In the drawings.

The features and advantages of the present solution will become more apparent from the detailed description set forth below when taken in conjunction with the drawings, in which like reference characters identify corresponding elements throughout. Other features, aspects, and advantages of the subject matter will become apparent from the description, the drawings, and the claims.

DETAILED DESCRIPTION

Figure 1:
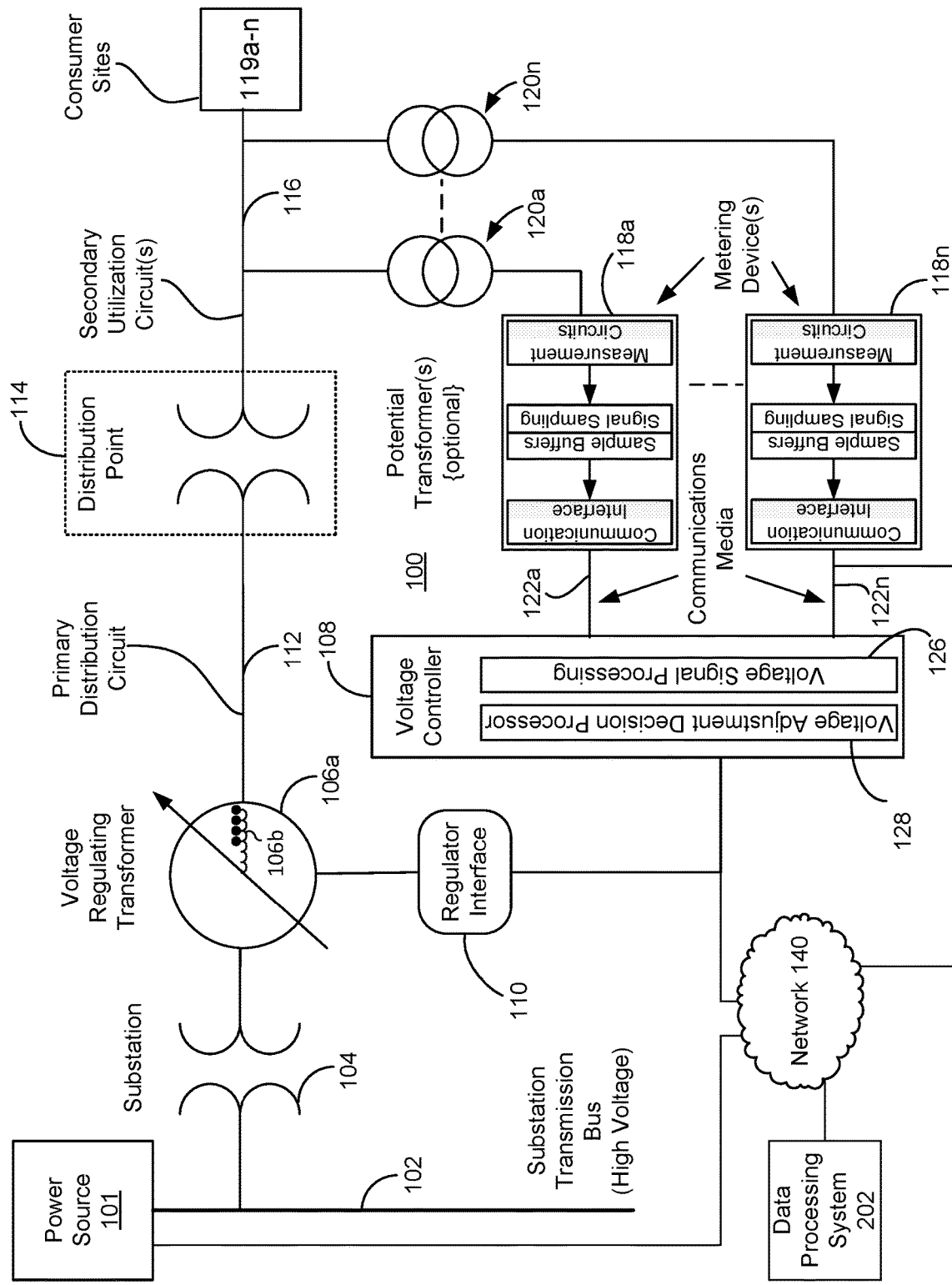
FIG. 1 is a block diagram depicting an illustrative utility grid, in accordance with an implementation.

Following below are more detailed descriptions of various concepts related to, and implementations of, methods, apparatuses, and systems of controlling components in a utility grid. The various concepts introduced above and discussed in greater detail below may be implemented in any of numerous ways.

A utility grid, or utility distribution system, can distribute electricity. A system that manages the utility grid can use power flow modeling to predict, identify or otherwise determine the real power, reactive power, and voltage effects of changes to the system. Using the power flow model can allow for improved or optimal device settings, operational control, and planning of future system resource consumption.

However, generating, constructing or building a power flow model can be challenging because they are built on deriving the resistance and reactance values from the physical properties of overhead and underground conductors, transformers, capacitors, reactors, generators, and loads of the utility grid circuit being modeled. When building a power flow model, certain assumptions, such as eliminating the magnetization branch in transformer modeling or removing resistive components from certain elements, may be made during the modeling in order to reduce the complexity of the calculations.

The systems and methods of this technical solution provide utility grid control using a data-driven, real-time, dynamic power flow model. For example, the technology disclosed herein can construct the power flow model by feeding recorded data from different physical locations/devices on the utility grid circuit into a machine learning generator which learns the characteristics of the utility grid circuit through training itself on the input data. By using a machine learning generator, the systems and methods of this technical solution can provide fast formation of the desired three-phase unbalanced power flow model using limited information about the system being modeled. The system can execute multiple steady-state load flow determinations at user-defined time steps to form a dynamic, real-time, time series prediction of the variables measured in the system being modeled. Examples of this load flow would be the prediction of a voltage or power time series at a secondary circuit measurement point given upstream load and voltage conditions, or the change in reactive power at downstream locations when a capacitor bank is switched. The time steps at which these predictions are made are limited by the sampling resolution of the data at the given location being predicted, such as sub-second time steps for very high-resolution devices, to hourly time steps for lower resolution data. These models can be updated whenever new input data is available, which can produce a dynamically accurate prediction during state changes in the circuit, such as when voltage optimization is turned on/off or when a portion of load is switched from one feeder to another. The forecasting range of these predictions is from the present to years ahead in time.

Thus, the systems and methods of the technical solution can provide Volt/VAR optimization and voltage management; system-state prediction, optimization and controls under various distributed energy resource scenarios (e.g., photovoltaic power generation, wind power generation, or electric vehicle penetration); fault, location, isolation, and system restoration; anti-islanding detection; or verification of the sequence and control of automatic switching, voltage control, and protection system operations.

To do so, a data processing system of this technical solution can receive and identify input data from different locations or devices on a utility grid (or utility distribution grid), such as an electricity distribution system. The input data, which can include or be referred to as signals, can be digitally recorded and transmitted by the devices on the utility grid, or other devices or servers remote from the utility grid. The signals can include raw measurements or detections made by sensors of the devices on the utility grid, or a device on the utility grid can pre-process the raw measurement or otherwise manipulate the data prior to transmitting the signal to the data processing system. Pre-processing the data locally by a device on the utility grid prior to transmission can facilitate higher prediction accuracy, or reduce network bandwidth utilization. For example, the data can be pre-processed to remove invalid samples or compress the signal data in manner that reduces network bandwidth utilization and removes erroneous data.

The data processing system can receive various types of signals. The types of signals can correspond to different locations on the utility grid. For example, a first type of signal can correspond to location generic signals, a second type of signal can correspond to a substation location on the utility grid, a third type of signal can correspond to a primary circuit on the utility grid, and a fourth type of signal can correspond to a secondary circuit on the utility grid.

These signals can be sampled in time at a rate that is equal to or greater than a predetermined or desired sampling resolution. For example, the sampling resolution in time of the signals can be greater than 1 sample every 60 seconds, such that the physical transfer functions of the circuit can be captured. If the resolution of the signals varies from one signal to another, the data processing system can synchronize the signals in time. The data processing system can identify erroneous samples and remove or modify them to clean the data to facilitate the production of accurate prediction results with the machine learning generator.

The data processing system can pre-process the received data or signals in order to increase the accuracy of the machine learning generator. For example, the data processing system can apply one or more filters to the data based on the sampling rate and other characteristics of the data. The data processing system can determine various statistical metrics from the data over time periods which define physical manifestations of system or exogenous behavior. For example, the data processing system can determine statistics such as a mean, median, minimum, maximum, standard deviation, mean difference, median difference, minimum difference, maximum difference, and standard deviation in difference.

The data processing system can generate an input matrix using the received data (e.g., cleaned and pre-processed) and the determined metrics. For example, the input matrix can include rows corresponding to timestamps and columns corresponding to the various signals and statistical metrics. The data processing system can weight timestamps (rows) within this training period in order to increase or decrease their importance when forming the model. The data processing system can separate the matrix into input and output variables (columns), which will be used as the inputs to the machine learning algorithm whose outputs predict the chosen output variables.

The data processing system, using the input matrix and machine learning model generator, can predict a corresponding output matrix. The model can predict a new output for a future time period, or predict an output value for a variable for which data does not exist in a current time period. The data processing system can predict how changes to a setting or parameter on the utility grid impacts an output variable. The data processing system can determine what or how to control a component on the utility grid in order to result in a desired outcome.

For example, the data processing system can optimize the voltage and VAR levels on the utility grid circuit for a technical utility grid operation goal (e.g., reduced energy usage, or stability during intermittent renewable generation). The data processing system can execute a closed optimization loop used to issue commands to utility grid devices. The data processing system can receive or ingest real-time data from utility grid devices and prior commands issued to these devices. The data processing system can predict the change in the utility grid conditions for a given set of device changes. The data processing system can evaluate the changes in grid conditions against the desired outcome. The data processing system can repeat this process, iterate through this process, or otherwise use the model to identify an optimal set of changes that satisfy the desired goal.

Thus, the data processing system of this disclosure can determine and model the relationships between variables and locations on the utility grid using recorded data. For example, a few days of data may be sufficient to begin accurately modeling these relationships, as compared to multiple years. Further, the data processing system can dynamically change the model in real time based on the electrical data received from the utility grid and used to update the model. The data processing system can, therefore, adapt to changes due to seasonality, equipment function, varying sources or loads, and exogenous factors, without obtaining these changes a priori and manually updating a static model.

The data processing system can be decentralized. For example, the systems and functionality of the data processing system can be performed in a distributed manner with each local data recording site performing processing and communicating among its neighbors. This can result in a decentralized collection of multiple models which can predict local variables using local inputs. The local models can access global information such as weather, electricity costs, and price signals used for the dispatch or conservation of local resources.

Referring now to FIG. 1, an example utility distribution environment is shown. The utility distribution environment can include a utility grid 100. The utility grid 100 can include an electricity distribution grid with one or more devices, assets, or digital computational devices and systems, such as computing device 500. In brief overview, the utility grid 100 includes a power source 101 that can be connected via a subsystem transmission bus 102 and/or via substation transformer 104 to a voltage regulating transformer 106a. The voltage regulating transformer 106a can be controlled by voltage controller 108 with regulator interface 110. Voltage regulating transformer 106a can be optionally coupled on primary distribution circuit 112 via optional distribution transformer 114 to secondary utilization circuits 116 and to one or more electrical or electronic devices 119. Voltage regulating transformer 106a can include multiple tap outputs 106b with each tap output 106b supplying electricity with a different voltage level. The utility grid 100 can include monitoring devices 118a-118n that can be coupled through optional potential transformers 120a-120n to secondary utilization circuits 116. The monitoring or metering devices 118a-118n can detect (e.g., continuously, periodically, based on a time interval, responsive to an event or trigger) measurements and continuous voltage signals of electricity supplied to one or more electrical devices 119 connected to circuit 112 or 116 from a power source 101 coupled to bus 102. A voltage controller 108 can receive, via a communication media 122, measurements obtained by the metering devices 118a-118n, and use the measurements to make a determination regarding a voltage tap settings, and provide an indication to regulator interface 110. The regulator interface can communicate with voltage regulating transformer 106a to adjust an output tap level 106b.

Still referring to FIG. 1, and in further detail, the utility grid 100 includes a power source 101. The power source 101 can include a power plant such as an installation configured to generate electrical power for distribution. The power source 101 can include an engine or other apparatus that generates electrical power. The power source 101 can create electrical power by converting power or energy from one state to another state. In some embodiments, the power source 101 can be referred to or include a power plant, power station, generating station, powerhouse or generating plant. In some embodiments, the power source 101 can include a generator, such as a rotating machine that converts mechanical power into electrical power by creating relative motion between a magnetic field and a conductor. The power source 101 can use one or more energy source to turn the generator including, e.g., fossil fuels such as coal, oil, and natural gas, nuclear power, or cleaner renewable sources such as solar, wind, wave and hydroelectric.

In some embodiments, the utility grid 100 includes one or more substation transmission bus 102. The substation transmission bus 102 can include or refer to transmission tower, such as a structure (e.g., a steel lattice tower, concrete, wood, etc.), that supports an overhead power line used to distribute electricity from a power source 101 to a substation 104 or distribution point 114. Transmission towers 102 can be used in high-voltage AC and DC systems, and come in a wide variety of shapes and sizes. In an illustrative example, a transmission tower can range in height from 15 to 55 meters or more. Transmission towers 102 can be of various types including, e.g., suspension, terminal, tension, and transposition. In some embodiments, the utility grid 100 can include underground power lines in addition to or instead of transmission towers 102.

In some embodiments, the utility gird 100 includes a substation 104 or electrical substation 104 or substation transformer 104. A substation can be part of an electrical generation, transmission, and distribution system. In some embodiments, the substation 104 transform voltage from high to low, or the reverse, or performs any of several other functions to facilitate the distribution of electricity. In some embodiments, the utility grid 100 can include several substations 104 between the power plant 101 and the consumer electoral devices 119 with electric power flowing through them at different voltage levels.

The substations 104 can be remotely operated, supervised and controlled (e.g., via a supervisory control and data acquisition system or data processing system 202). A substation can include one or more transformers to change voltage levels between high transmission voltages and lower distribution voltages, or at the interconnection of two different transmission voltages.

The regulating transformer 106 can include: (1) a multi-tap autotransformer (single or three phase), which are used for distribution; or (2) on-load tap changer (three phase transformer), which can be integrated into a substation transformer 104 and used for both transmission and distribution. The illustrated system described herein can be implemented as either a single-phase or three-phase distribution system. The utility grid 100 can include an alternating current (AC) power distribution system and the term voltage can refer to an "RMS Voltage", in some embodiments.

The utility grid 100 can include a distribution point 114 or distribution transformer 114, which can refer to an electric power distribution system. In some embodiments, the distribution point 114 can be a final or near final stage in the delivery of electric power. For example, the distribution point 114 can carry electricity from the transmission system (which can include one or more transmission towers 102) to individual consumers 119. In some embodiments, the distribution system can include the substations 104 and connect to the transmission system to lower the transmission voltage to medium voltage ranging between 2 kV and 35 kV with the use of transformers, for example. Primary distribution lines or circuit 112 carry this medium voltage power to distribution transformers located near the customer's premises 119. Distribution transformers can further lower the voltage to the utilization voltage of appliances and can feed several customers 119 through secondary distribution lines or circuits 116 at this voltage. Commercial and residential customers 119 can be connected to the secondary distribution lines through service drops. In some embodiments, customers demanding high load can be connected directly at the primary distribution level or the sub-transmission level.

The utility grid 100 can include or couple to one or more consumer sites 119. Consumer sites 119 can include, for example, a building, house, shopping mall, factory, office building, residential building, commercial building, stadium, movie theater, etc. The consumer sites 119 can be configured to receive electricity from the distribution point 114 via a power line (above ground or underground). A consumer site 119 can be coupled to the distribution point 114 via a power line. The consumer site 119 can be further coupled to a site meter 118a-n or advanced metering infrastructure ("AMI"). The site meter 118a-n can be associated with a controllable primary circuit segment 112. The association can be stored as a pointer, link, field, data record, or other indicator in a data file in a database.

The utility grid 100 can include site meters 118a-n or AMI. Site meters 118a-n can measure, collect, and analyze energy usage, and communicate with metering devices such as electricity meters, gas meters, heat meters, and water meters, either on request or on a schedule. Site meters 118a-n can include hardware, software, communications, consumer energy displays and controllers, customer associated systems, Meter Data Management (MDM) software, or supplier business systems. In some embodiments, the site meters 118a-n can obtain samples of electricity usage in real time or based on a time interval, and convey, transmit or otherwise provide the information. In some embodiments, the information collected by the site meter can be referred to as meter observations or metering observations and can include the samples of electricity usage. In some embodiments, the site meter 118a-n can convey the metering observations along with additional information such as a unique identifier of the site meter 118a-n, unique identifier of the consumer, a time stamp, date stamp, temperature reading, humidity reading, ambient temperature reading, etc. In some embodiments, each consumer site 119 (or electronic device) can include or be coupled to a corresponding site meter or monitoring device 118a-118n.

Monitoring devices 118a-118n can be coupled through communications media 122a-122n to voltage controller 108. Voltage controller 108 can compute (e.g., discrete-time, continuously or based on a time interval or responsive to a condition/event) values for electricity that facilitates regulating or controlling electricity supplied or provided via the utility grid. For example, the voltage controller 108 can compute estimated deviant voltage levels that the supplied electricity (e.g., supplied from power source 101) will not drop below or exceed as a result of varying electrical consumption by the one or more electrical devices 119. The deviant voltage levels can be computed based on a predetermined confidence level and the detected measurements. Voltage controller 108 can include a voltage signal processing circuit 126 that receives sampled signals from metering devices 118a-118n. Metering devices 118a-118n can process and sample the voltage signals such that the sampled voltage signals are sampled as a time series (e.g., uniform time series free of spectral aliases or non-uniform time series).

Voltage signal processing circuit 126 can receive signals via communications media 122a-n from metering devices 118a-n, process the signals, and feed them to voltage adjustment decision processor circuit 128. Although the term "circuit" is used in this description, the term is not meant to limit this disclosure to a particular type of hardware or design, and other terms known generally known such as the term "element", "hardware", "device" or "apparatus" could be used synonymously with or in place of term "circuit" and can perform the same function. For example, in some embodiments the functionality can be carried out using one or more digital processors, e.g., implementing one or more digital signal processing algorithms. Adjustment decision processor circuit 128 can determine a voltage location with respect to a defined decision boundary and set the tap position and settings in response to the determined location. For example, the adjustment decision processing circuit 128 in voltage controller 108 can compute a deviant voltage level that is used to adjust the voltage level output of electricity supplied to the electrical device. Thus, one of the multiple tap settings of regulating transformer 106 can be continuously selected by voltage controller 108 via regulator interface 110 to supply electricity to the one or more electrical devices based on the computed deviant voltage level. The voltage controller 108 can also receive information about voltage regulator transformer 106a or output tap settings 106b via the regulator interface 110. Regulator interface 110 can include a processor controlled circuit for selecting one of the multiple tap settings in voltage regulating transformer 106 in response to an indication signal from voltage controller 108. As the computed deviant voltage level changes, other tap settings 106b (or settings) of regulating transformer 106a are selected by voltage controller 108 to change the voltage level of the electricity supplied to the one or more electrical devices 119.

The network 140 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, or 4G. The network standards can qualify as one or more generation of mobile telecommunication standards by fulfilling a specification or standards such as the specifications maintained by International Telecommunication Union. The 3G standards, for example, can correspond to the International Mobile Telecommunications-2000 (IMT-2000) specification, and the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 140 can be any type and/or form of network. The geographical scope of the network 140 can vary widely and the network 140 can be a body area network (BAN), a personal area network (PAN), a local-area network (LAN), e.g. Intranet, a metropolitan area network (MAN), a wide area network (WAN), or the Internet. The topology of the network 140 can be of any form and can include, e.g., any of the following: point-to-point, bus, star, ring, mesh, or tree. The network 140 can be an overlay network which is virtual and sits on top of one or more layers of other networks 140. The network 140 can be of any such network topology as known to those ordinarily skilled in the art capable of supporting the operations described herein. The network 140 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 140 can be a type of a broadcast network, a telecommunications network, a data communication network, or a computer network.

One or more components, assets, or devices of utility grid 100 can communicate via network 140. The utility grid 100 can use one or more networks, such as public or private networks. The utility grid 100 can communicate or interface with a data processing system 202 designed and constructed to communicate, interface or control the utility grid 100 via network 140. Each asset, device, or component of utility grid 100 can include one or more computing devices 500 or a portion of computing 500 or a some or all functionality of computing device 500.

Figure 2:
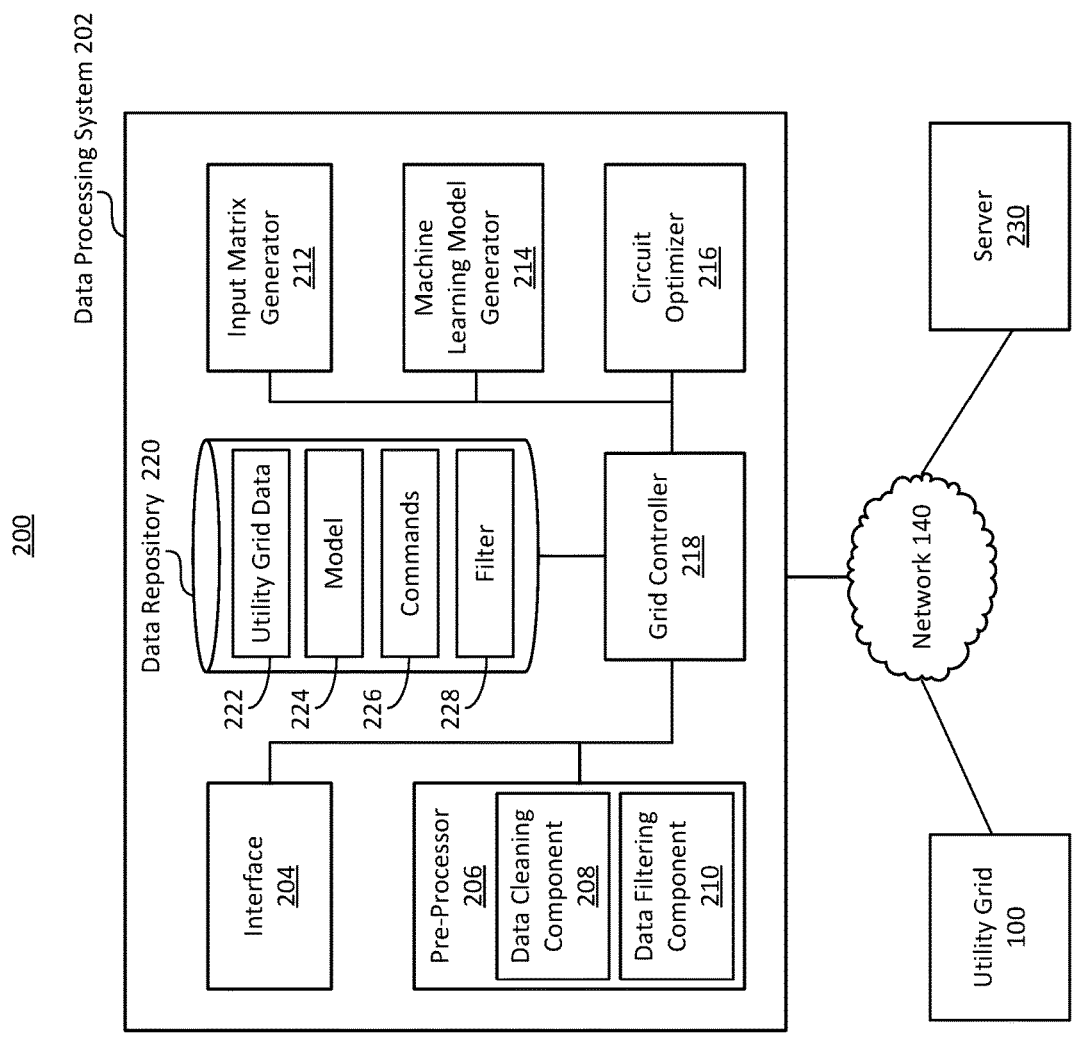
FIG. 2 is a bock diagram depicting a system for controlling components in a utility grid, in accordance with an implementation.

FIG. 2 depicts a block diagram depicting an example system to control components of a utility grid. The system 200 can include at least one data processing system 202. The data processing system 202 can include at least one interface 204, at least on pre-processor 206 (or pre-processor component), at least one input matrix generator 212 (or input matrix generator component), at least one machine learning model generator 214 (or machine learning model generator component), at least one circuit optimizer 216 (or circuit optimizer component), or at least one grid controller 218 (or grid controller component). The pre-processor 206 can include at least one data cleaning component 208 or at least one data filtering component 210. The data processing system 202 can include at least one data repository 220. The data processing system 202 can include hardware or a combination of hardware and software, such as communications buses, circuitry, processors, communications interfaces, among others.

The data processing system 202 can reside on a computing device of the utility grid 100, or on a computing device or server external from, or remote from the utility grid 100. The data processing system 202 can reside or execute in a cloud computing environment or distributed computing environment. The data processing system 202 can reside on or execute on multiple local computing devices located throughout the utility grid 100. For example, the utility grid 100 can include multiple local computing devices each configured with one or more components or functionality of the data processing system 202.

Each of the components of the data processing system 202 can be implemented using hardware or a combination of software and hardware. Each component of the data processing system 202 can include logical circuitry (e.g., a central processing unit or CPU) that responses to and processes instructions fetched from a memory unit (e.g., memory 515 or storage device 525). Each component of the data processing system 202 can include or use a microprocessor or a multi-core processor. A multi-core processor can include two or more processing units on a single computing component. Each component of the data processing system 202 can be based on any of these processors, or any other processor capable of operating as described herein. Each processor can utilize instruction level parallelism, thread level parallelism, different levels of cache, etc. For example, the data processing system 202 can include at least one logic device such as a computing device or server having at least one processor to communicate via the network 140.

The components and elements of the data processing system 202 can be separate components, a single component, or part of the data processing system 202. For example, the interface 204, pre-processor 206, or input matrix generator 212 (and the other elements of the data processing system 202) can include combinations of hardware and software, such as one or more processors configured to ingest data, generate an input matrix, or execute a model, for example.

The components of the data processing system 202 can be connected or communicatively coupled to one another. The connection between the various components of the data processing system 202 can be wired or wireless, or any combination thereof. Counterpart systems or components can be hosted on other computing devices.

The network 140 can include computer networks such as the internet, local, wide, near field communication, metro or other area networks, as well as satellite networks or other computer networks such as voice or data mobile phone communications networks, and combinations thereof. The network 140 can include a point-to-point network, broadcast network, telecommunications network, asynchronous transfer mode network, synchronous optical network, or a synchronous digital hierarchy network, for example. The network 140 can include at least one wireless link such as an infrared channel or satellite band. The topology of the network 140 can include a bus, star, or ring network topology. The network 140 can include mobile telephone or data networks using any protocol or protocols to communicate among vehicles or other devices, including advanced mobile protocols, time or code division multiple access protocols, global system for mobile communication protocols, general packet radio services protocols, or universal mobile telecommunication system protocols, and the same types of data can be transmitted via different protocols.

The data processing system 202 can include, or have access to, a data repository 220. The data repository 220 can include or be managed by a database. The data repository 220 can include any type of data storage, memory, file server, hard drive, or cloud storage. The data repository 220 can store data in one or more data structures or data files.

The data repository 220 can include, store, or manage utility grid data 222, models 224, commands 226, or filters 228, in addition to other information, rules, programs or data that facilitate one or more component or functional of the system 200.

Utility grid data 222 can include one or more signals, values, or other information received from, or associated with, the utility grid 100 depicted in FIG. 1. The data processing system 202 can receive some or all the utility grid data from devices location on the utility grid 100, or other data sources or servers associated with the utility grid 100 or data processing system 202.

The utility grid data 222 can include various types of signals. The types of signals can correspond to different locations on the utility grid 100. For example, a first type of signal can correspond to location generic signals, a second type of signal can correspond to a substation location (e.g., substation 104) on the utility grid 100, a third type of signal can correspond to a primary circuit (e.g., primary distribution circuit 112) on the utility grid 100, and a fourth type of signal can correspond to a secondary circuit (e.g., secondary utilization circuits 116 or consumer sites 119a-n) on the utility grid 100.

Signals from the substation 104 (which can be referred to as substation signals) can include or correspond to signals received from devices located at the substation 104 or associated with the substation 104. Substation devices can include, for example, a voltage regulator (e.g., regulator interface 110 or voltage regulating transformer 106a), a load tap changer (e.g., 106b), a substation meter, a digital relay, or a circuit breaker. Signals from a voltage regulator or load tap changer can include a tap position, voltage setpoint, operating mode, or dwell time. Signals from a substation meter can include real power (single- or three-phase), reactive power (single- or three-phase), voltage (single phase), or power factor (single- or three-phase). Signals from a digital relay can include current (phase, phase-to-phase, positive sequence, negative sequence and zero sequence), voltage (phase, phase-to-phase, positive sequence, negative sequence and zero sequence), or frequency. Signals from a circuit breaker located at the substation 104 can include status or trip settings.

The data processing system 202 can receive signals from devices located at, or associated with, the primary circuit 112. Devices located on the primary circuit 112 can include, for example, a primary circuit meter, capacitor bank, voltage regulator, line voltage monitor, solar inverter, digital relay, circuit breaker, recloser, switch, or fuse. Signals received from a primary circuit meter can include real power (single- or three-phase), reactive power (single- or three-phase), voltage (phase- or phase-to-phase), or power factor (single- or three-phase). Signals received from a capacitor bank located at the primary circuit 112 can include bank state, setpoint, operating mode, dwell time, reactive power (single- or three-phase), or voltage ((phase- or phase-to-phase). Signals received from a voltage regulator located on the primary circuit 112 can include tap position, setpoint, operating mode, dwell time, source-side voltage (phase- or phase-to-phase), or load-side voltage (phase- or phase-to-phase). Signals received from a line voltage monitor located on the primary circuit 112 can include voltage (single phase), current (phase- or phase-to-phase), real power (single- or three-phase), or reactive power (single- or three-phase). Signals received from a solar inverter located on the primary circuit 112 can include inverter status, operating mode, current, voltage, real and reactive power. Signals received from a digital relay located at the primary circuit 112 can include current (phase, phase-to-phase, positive sequence, negative sequence and zero sequence), voltage (phase, phase-to-phase, positive sequence, negative sequence and zero sequence), or frequency. Signals received from a circuit breaker, recloser, switch, or fuse located at the primary circuit 112 can include status signals or trip settings.

The data processing system 202 can receive, and store in the utility grid data 222, signals from devices located at the secondary circuit 116. Devices located at the secondary circuit 116 can include, for example, a solar inverter, electric vehicle charging point, electric vehicle inverter, residential electric meter, or other devices located at consumer sites 119a-n. Signals received from solar or electric inverters, or electric vehicle charging points can include operating mode, setpoint, real power (single- or three-phase), reactive power (single- or three-phase), or voltage (phase- or phase-to-phase). Signals received from residential electric meters can include, for example, real power (single- or three-phase), reactive power (single- or three-phase), voltage phase- or phase-to-phase), current (single- or three-phase), power factor (single- or three-phase), current angle (single- or three-phase), phase-to-phase voltage angle (three-phase only), frequency, or temperature.

The data processing system 202 can receive, and the utility grid data 222 can include, signals or data from sources external to the utility grid 100. External sources can include, for example, a server 230 or database associated with a server 230 that is remote from the data processing system 202 and the utility grid 100. External sources can provide information that is generic in the sense that it may not come from a specific device on the utility grid 100 or be measured by a specific device on the utility grid 100. Generic information can refer to general information associated with a geographic area, temporal information, or other types of information. Generic or general signals can include, for example, time-of-day, day-of-week, day-of-year, current weather, forecasted weather, current and forecasted cost of electricity generation (e.g., resource rate of transmission), current and forecasted cost of energy delivery (e.g., resource rate of energy delivery), current and forecasted transmission, price signals, or distribution capacity.

The data repository 220 can include, store or manage one or more models 224. The model 224 can refer to or include a machine learning model. The model 224 can include a voltage power flow model generated, constructed or trained by a machine learning model generator 214. The model 224 can include a statistical representation of a utility grid 100 process that is generated based on utility grid data 222.

The data repository 220 can include or store commands 226. Commands 226 data structure can include control commands to control devices on the utility grid 100, alerts, notifications, reports, instructions, or other actions that can be performed by the data processing system 202 responsive to, or based on, utility grid data 222. Examples of commands 226 can include a command to increase or decrease a tap setting of a voltage regulating transformer 106a on the primary circuit 112, or change a setpoint on the primary circuit 112 or secondary circuit 116. Additional actions or determinations can include determining a topology of a utility grid 100 (e.g., main branches, secondary branches, customer sites or other connections or couplings of the utility grid 101).

The data repository 220 can include filters 228. A filter 228 can refer to or include a signal processing filter, such as a low pass filter, bandpass filter, or high pass filter. A filter 228 can include a filter to smooth utility grid data or signals, such as a smoothness filter. A smoothness filter can create an approximating function that attempts to capture patterns or trends in the data, while leaving out noise or other fine-scale structures or instantaneous spikes or dips. The data processing system 202, using a smoothness filter, can modify data points of a signal so individual points can be reduced, and points that are lower than the adjacent points are increased, leading got a smoother signal. Examples of smoothness filters or techniques can include a linear smoother (e.g., where smoothed values are provided as a linear transformation of the observed values), additive smoothing, Butterworth filter, Chebyshev filter, digital filter, elliptic filter, exponential smoothing, Kalman filter, or moving average.

The data processing system 202 can include an interface 204 designed, constructed and operational to identify or receive utility grid data or signals. The interface 204 can include any type of communication interface, including a wired or wireless interface, network interface, or communication ports. The utility grid data or signals can be digitally recorded by a respective device on the utility grid 100, and transmitted to the data processing system 202 for processing. The data processing system 202 can receive the utility grid data as a real-time feed or stream. Real-time can refer to receiving signals from the utility grid 100 responsive to the devices on the utility grid 100 measuring or detecting values for the signal, as opposed to receiving the signals in a batch upload that occurs periodically or based on a time interval (e.g., every 6 hours, 12 hours, 24 hours, 48 hours or some other time period). Receiving the signals in real-time can refer to receiving the signals within 30 minutes of a device measuring or detecting the signals, 15 minutes, 10 minutes, 5 minutes, 1 minute, 30 seconds, 10 seconds, 5 seconds or less.

The data processing system 202 can receive a real-time feed or stream of signals. The signals can be sampled at a sampling rate. Signals can be sampled at a same rate, or different rates. Different types of signals can be sampled at different rates. Signals from different devices, although a same type of signal, may be sampled at different rate due to different device configurations or capabilities. The interface 204 can receive the signals at one or more sampling rates and store the signals in the utility grid data structure 222 for further processing by the data processing system 202.

The interface 204 can pull signals, or receive signals pushed to the data processing system 202. For example, the interface 204 can poll or ping devices on the utility grid 100 for signals or data. The interface 204 can generate a request for utility grid data or signals, transmit the request, and receive the data responsive to the request. The interface 204 can generate a request for utility grid data, and transmit the request to a server 230 via network 140. For example, the data processing system 202, via interface 204, can transmit a request to server 230 for the time or date, current weather, forecasted weather, cost of electricity, or cost of energy delivery.

The data processing system 202 can include a pre-processor 206 designed, constructed or operational to clean, filter or otherwise manipulate or process the received utility grid data or signals. The pre-processor 206 can clean, filter or otherwise manipulate or process the received utility grid data or signals prior to the input matrix generator 212 using the received utility grid data to generate an input matrix for input into the machine learning model generator 214 or the machine learning model. In some cases, the device on the utility grid 100 can apply one or more pre-processing technique prior to transmitting the data or signals to the data processing system 202. Local pre-preprocessing by a device on the utility grid 100 using one or more technique or function of the pre-processor 206 can reduce network bandwidth consumption or facilitate higher prediction accuracy by the data processing system 202.

The pre-processor 206 can analyze the received the utility grid data or signals to determine a sampling resolution. The pre-processor 206 can determine the sampling resolution for each type of signal, each type of signal from a specific device, or each signal from a specific device located on the utility grid 100. A type of signal can have the same sample rate across different devices, or different sampling rates among different devices. A type of device can sample signals at the same rate as other devices of the same type, or devices of the same type may sample signals at different rates. A single device can sample all signals for which the device is configured to sample at a same rate, or the same device can sample different signals at different rates. Thus, the signals received by the data processing system 202 can have varying sampling rates. The sampling rates can, for example, be greater than or equal to 1 sample every 120 seconds, 1 sample every 90 seconds, 1 sample every 60 seconds, 1 sample every 45 seconds, 1 sample every 30 seconds or faster. Having a high sampling rate can facilitate the data processing system 202 adequately capturing the physical transfer function of the utility grid circuit.

The data processing system 202 (e.g., via pre-processor 206) can determine that a sampling rate for a first signal of the first plurality of signals is different from a sampling rate for a second signal of the first plurality of signals. The data processing system 202 can synchronize the first signal with the second signal. The data processing system 202 can clean the first plurality of signals to remove time periods corrupted by noise or comprising null values.

For example, the data cleaning component 208 can synchronize the signals. Signals may be sampled at different rates such that samples have different timestamps. The data processing system 202 can identify a time period, and then synchronize the signal such that each signal has a sample for the timestamp. For example, the data processing system 202 can establish a sample rate that is common to the received signals. The common sample rate may be the lowest sample rate of the received signals, such as 1 sample every 60 seconds. The data processing system 202 can then use the 1 sample every 60 seconds sample rate as the sample rate to synchronize the received signals. The data processing system 202 can synchronize the signals by identify one sample for each signal for each 60 second time period. The data processing system 202 can identify the sample based on an average (or other statistic) of samples in the time period, the first sample in the time period (e.g., if a signal is sampled once every 30 seconds).

The data cleaning component 208 can synchronize signals by correlating timestamps among signals to identify a time period to which the samples corresponds. For example, two signals may be sampled at the same sample rate (e.g., once every 60 seconds), but they may be offset by approximately 5 seconds. The data processing system 202 can determine to synchronize two samples by determining that the offset between the two samples is less than the sample period of the signal. The data processing system 202 can determine to associate the two samples of the two different signals with a first time period if the different is less than or equal to half the sample period of the signal, and associate a sample of the first signal with a subsequent signal if the offset is greater than half the sample period, for example. Thus, the data processing system 202 can use one or more data synchronization techniques.

The signals received by the data processing system 202 may include invalid samples, missing samples, outliers, corrupted samples, or other erroneous data. The pre-processor 206 can include a data cleaning component 208 designed, constructed and operational to clean the received data and synchronize the signals. The data cleaning component 208 can clean the data in order to facilitate the production of accurate prediction results with the machine learning model. The data cleaning component 208 can use one or more techniques to clean the data. The data cleaning component 208 can detect errors and anomalies in the data, and correct the anomaly or remove the sample from the data set. The data cleaning component 208 can be configured with one or more rules, policies, logic, or heuristic techniques to detect errors or anomalies in the data, and resolve such errors. For example, the data cleaning component 208 can clean the data by removing time periods of data from variables or signals which were corrupted by noise, have been influenced by something that is an outlier from the nominal behavior (unless this outlier is of interest to predict), or have null values due to communications loss or failed recording.

To clean the data, the data cleaning component 208 can compare sample values of a signal with a threshold, nominal value, or statistical metric to determine whether the sample value is an outlier or erroneous. For example, if the sample value is a null value, then the data processing system 102 can determine the sample value is erroneous and remove the sample value. If the sample value is less than or equal to a predetermined threshold, then the data processing system 102 can determine the sample value is erroneous and remove the sample value. If the sample value is greater than or equal to a predetermined threshold, then the data processing system 102 can determine the sample value is erroneous and remove the sample value. The predetermined thresholds can be established or set by an administrator of the data processing system 202 in a configuration file stored in data repository 220. The threshold can be dynamically determined, for example based on an average, moving average, or other statistical metric associated with previous samples of the same signal.

Upon detecting that one or more samples of at least one signal from the received utility grid data set is invalid, corrupted by noise or includes null values, the data processing system 202 can clean the signal. The data processing system 202 can clean the signal by removing the sample from the data set. The data processing system 202 can further identify samples of other signals at the same timestamp, and remove those samples as well, thereby maintaining synchronicity of the utility grid data. For example, data processing system 202 can determine that a sample of a first signal at a timestamp is invalid or erroneous. The data processing system 202 can then identify all samples from all signals having the same timestamp, and then remove those samples from the data set. Time periods of data that were removed from one variable or signal can be removed from all variables (both input and output).

The data processing system 202 (e.g., via data filtering component 210) can filter signals or the utility grid data. The data processing system 202, or pre-processor 206, can include a data filter component 210 designed, constructed or operational to filter signals. Filtering the signals can increase the accuracy of the machine learning model generated by the machine learning model generator 214. The data filter component 210 can select a filter from the filter 228 data structure in data repository 220. The data filter component 210 can select a filter based on a characteristic of the signal being filtered, or the data set being filter. The data filtering component 210 can apply a filter to reduce noise in the data set. The data filter component 210 can apply a filter to smooth the data set or signals by removing noise, but without removing a trend in the signal. The data filter component 210 can apply filters 228 such as a low pass filter, bandpass filter, or high pass filter. The data filter component 210 can apply filters 228 to smooth utility grid data or signals, such as a smoothness filter. A smoothness filter can create an approximating function that attempts to capture patterns or trends in the data, while leaving out noise or other fine-scale structures or instantaneous spikes or dips. The data processing system 202, using a smoothness filter, can modify data points of a signal so individual points can be reduced, and points that are lower than the adjacent points are increased, leading got a smoother signal. Examples of smoothness filters or techniques can include a linear smoother (e.g., where smoothed values are provided as a linear transformation of the observed values), additive smoothing, Butterworth filter, Chebyshev filter, digital filter, elliptic filter, exponential smoothing, Kalman filter, or moving average (e.g., replacing each data point with the average of the neighboring data points defined with a span).

Thus, the data processing system 202 can apply a low-pass filter to the signals or the utility grid data, and apply a smoothness filter selected based on the sampling rate of the data and the desired smoothness of the output signals. The data processing system 202 can select the smoothness filter such that the underlying trends are preserved while discarding stochastic noise. For example, the data processing system 202 can select a filter configured to apply equal weights over the input samples. In another example, the data processing system 202 can select a filter configured with a user-specified weighting that applies different weights to each sample based on a desired emphasis of the input data. The length in time of the filter can be selected based on the timescale of the underlying characteristics that are being targeted, e.g., a short filter for transient signals and a long filter for more steady-state characteristics. For example, if the sample rate is fast, then the data processing system 202 can select a smoothness filter that can leverage the additional data samples to determine a trend and smooth the data. However, if the sample rate is low, then the data processing system 202 can select a smoothness filter that is more sensitive to the low data rate and lack of sufficient data, thereby preventing the smoothness filter from inadvertently altering the signal trend.

The pre-processor 206 can determine or generate statistical metrics based on the received signals or utility grid data. The pre-processor 206 can determine one or more statistical metrics based on signals from the substation 104, the primary circuit 112, the secondary circuit 116, or the generic signals not from the utility grid 100. The pre-processor 206 can generate, determine or otherwise identify statistical metrics that include, for example, a mean, median, minimum, maximum, standard deviation, mean difference, median difference, minimum difference, maximum difference, and standard deviation in difference. The pre-processor 206 can generate the statistical metric over a time period that indicates a physical manifestation of the utility grid system behavior or an exogenous behavior. The pre-processor 206 can provide these statistics as new inputs to the input matrix generator 212 to cause the input matrix generator 212 use these statistical metrics simultaneously with the utility grid signals received from devices on the utility grid 100.

The pre-processor 206 can store the pre-processed signals in utility grid data structure 222 for further processing by the data processing system 202. The pre-processor 206 can provide the pre-processed signals to the input matrix generator 212 for further processing. For example, the pre-processor 206, upon synchronizing, cleaning and filtering the received signals or utility grid data, can provide the data to the input matrix generator 212.

The data processing system 202 can include an input matrix generator 212 designed, constructed and operational to generate an input matrix. The input matrix generator 212 can receive utility grid data or signals from the pre-processor 206. In some cases, the input matrix generator 212 can receive the utility grid data or signals directly from the interface 204, or devices on the utility grid 100. For example, the devices on the utility grid 100 can be capable of performing local pre-processing, including one or more functionality of pre-processor 206, in which case the data processing system 202 may not perform further pre-processing via the pre-processor 206.

The input matrix generator 212 can generate a matrix have two or more dimension. The input matrix generator 212 can generate a two-dimensional ("2D") matrix in which a first dimension corresponds to timestamps, and a second dimension corresponds to signals (or variables or values). For example, in a 2D matrix or array, the rows can correspond to timestamps, and the columns can correspond to signals, as illustrated in Table 1.

received from the utility grid 100, as well as statistical metrics generated based on the received signals. The statistical metrics can be generated using the synchronized, cleaned and filtered signals. The rows of the matrix can be timestamps at which the data were recorded, and the columns of the matrix can be distinct variables or signals as well as the statistical inputs determined from the measured inputs. The length of time covered by the rows of the matrix can encompass any relevant behavior which the machine learning model should be able to predict.

The input matrix can include a historical input matrix. A historical input matrix can refer to or include signals that may not be real-time signals in that the signals were received previously. For example, the historical input matrix can include signals from a previous 24 hour period, 48 hour period, 72 hour period, a week, 2 weeks, 30 days, or some other time period prior to the current time period. The historical input matrix can be provided by an administrator of the data processing system 202, or stored in data repository 220. The input matrix generator 212 can apply one or more weights to a dimension of the historical input matrix to adjust an impact values of the dimension have on the machine learning model.

The input matrix generator 212 can weight values in a dimension to increase or decrease the impact the values has when the machine learning model generator 214 forms the

TABLE 1

Illustrative Example of a 2D Input Matrix

| Timestamps\Signals | Current Weather | Substation Voltage Regulator Tap Position | Primary Circuit Meter Voltage | Secondary Circuit Electric Charge Point Operating Mode | Moving Average of Voltage over 3 samples |
|---|---|---|---|---|---|
| $t_0$ | 75° F. | 3 | 800 V | Off | n/a |
| $t_0 + 0.1$ | 75° F. | 3 | 799 V | On | n/a |
| $t_0 + 0.2$ | 75° F. | 3 | 798 V | On | 799 V |
| $t_0 + 0.3$ | 75° F. | 3 | 798 V | On | 798.3 V |
| $t_0 + 0.4$ | 75° F. | 4 | 797 V | On | 797.7 V |
| $t_0 + 0.5$ | 75° F. | 4 | 796 V | On | 797 V |

As illustrated in the example Table 1, the input matrix generator 212 can generate an input matrix with two or more dimensions. A first dimension can be rows that includes timestamps. The first timestamps can be in a format such as <date>.<hr>.<min>.<sec>. The first timestamp, represented as t0 in this example, can be in this format. The second and subsequent timestamps can also be in this format, or any other format. The example input matrix in Table 1 includes signals Current Weather, Substation Voltage regulator tap position, primary circuit meter voltage, secondary circuit electric charge point operating mode, and moving average of voltage over three samples. In this example, input signals can include Current Weather, Substation Voltage regulator tap position, secondary circuit electric charge point operating mode. The output signal can include primary circuit meter voltage and moving average of voltage over three samples. In some cases, the input signal can also include primary circuit meter voltage and moving average of voltage over three samples. The values for the signals can be temperature, tap position, voltage, or state or mode information (e.g., charging on or off, active or inactive, or standby mode).

The input matrix generator 212 can generate the input matrix using the synchronized, cleaned, and filtered signals model. For example, the input matrix generator component 212 can weight timestamps (e.g., rows) within a time period in order to increase or decrease the importance of the signals for the timestamp when forming the model. The input matrix can be separated into input and output variables (columns), which can be used as the inputs to the machine learning technique used to generate the machine learning model configured to output a prediction of the chosen output variables. The input matrix generator 212 can determine how to weight the rows based on an analysis of the signals, or based on input from an administrator of the data processing system 202. The weights can be assigned based on events identified in the signals, or events determined by other sources associated with the utility grid 100. The weights can be assigned based on rules or logic used to parse or process the input matrix to identify conditions or events that reflect higher or lower importance. For example, weights can be increased around a tap setting change event (e.g., the tap setting change from 3 to 4 at $t_o+0.4$ in Table 1. A tap setting change can be a behavior of the system that is the result of characteristics of electricity distribution via the utility grid 100. The weights can be increased around an operating mode change at an electric vehicle charging point (e.g., not charging to charging).

For example, the input matrix can be weighted such that certain timestamps or signals are treated with increased or decreased importance by the machine learning model generator 214. Weights can be automatically or manually applied. For example, the input matrix generator 212 can automatically weight values in the input matrix using a policy, such as based on detecting a condition or event in the input matrix. Weighting can refer to modifying values based on a factor, or function (e.g., double weight by multiplying each value by 2; or using a threshold to modify the value to a predetermined based on whether the input value is less than or equal to, or greater than the threshold).

To create the input matrix, the input matrix generator component 212 can obtain the received signals, chronologically order them based on timestamps associated with each of the signals, and place the values in one dimension, and the timestamps in another dimension. The input matrix generator 212 can generate one or more matrices. For example, the input matrix generator 212 can generate a different matrix for each relevant time period (e.g., a predetermined time period such as 1 minute, 5 minutes, 10 minutes, 30 minutes, 60 minutes, or some other time period). The input matrix generator 212 can generate separate matrices based on behaviors identified in the data, such as tap setting changes, operating mode of a charging point, or other conditions or events. For example, a first input matrix may not include any signals indicating a change in a tap settings, whereas a second input matrix may include signals preceding the tap setting change, and subsequent to the tap setting change.

The input matrix generator 212 can perform one or more validation checks or error checks prior to providing the input matrix to the machine learning model generator 214. For example, the input matrix generator 212 can confirm that the dimensions of the input matrix satisfy a predetermined number of minimum dimensions. The input matrix generator 212 can confirm that the number of timestamps or signals satisfy a minimum threshold for the number of timestamps (or time period) or number of signals. For example, the minimum threshold for time period may be 1 minute, 2 minutes, 3 minutes, 4 minutes, 5 minutes, 10 minutes, 15 minutes, 30 minutes, 1 hour or some other time period that is representative or indicative of behavior of the utility grid 100. The minimum number of signals can include, for example, at least one signal from each location of the utility grid 100 (e.g., substation, primary circuit, and secondary circuit), or a minimum number of types of signals from each location on the utility grid 100 (e.g., real power, voltage, current, or tap position).

In the event the input matrix generator 212 determines that the generated input matrix does not include the minimum number of dimensions, timestamps, or values, the input matrix generator 212 can block or prevent the input matrix from being input to the machine learning model generator 214. Blocking input of the input matrix into the machine learning model generator 214 can prevent the invalid, incomplete, or failing input matrix from skewing or corrupting the model being trained or generated by the machine learning model generator 214. In some cases, however, the input matrix generator 212 can pass the incomplete input matrix to the machine learning model generator 214 to cause the machine learning model generator 214 to complete the input matrix by predicting the missing values (e.g., if the input matrix contains sufficient data that the machine learning model generator 214 can predict, with sufficient confidence, the missing values).

The data processing system 202 can include a machine learning model generator 214. The machine learning model generator 214 can be designed, constructed and operational to generate a machine learning model. The machine learning model generator 214 can use one or more machine learning techniques, functions, or processes to generate or train a model. For example, the machine learning model generator 214 can be configured with machine learning techniques including linear discriminant analysis (e.g., a technique configured to identify a linear combination of features that characterizes or separates two or more classes objects or events in order to express a dependent variable, such as an output signal, as a linear combination of other features or measurement signals in the input matrix), naive Bayes (e.g., a probabilistic classifier that can make classifications using a posterior decision rules with features and classes to determine the probability of the features, such as in the input matrix, occurring in each class, such as output signals, and return the most likely class), regression tree (e.g., using a decision tree as a predictive model where the target variable can take continuous values of an input matrix and go from observations about the input matrix to conclusions about the target value or output signal, such as an output signal), random forest (e.g., constructing multiple decision trees or regression trees at training time and outputting a mean prediction of the individual trees), k-nearest neighbor (e.g., a non-parametric process for classification or regression where the input matrix includes the k number of closets training examples in a feature space, and the output can be a class membership or a value of an output signal based on an average of the values of k nearest neighbors), support vector machine (e.g., a supervised learning model that analyzes input matrix data used for classification and regression analysis configured to build a model that assigns new examples, such as new input matrix, to one category or the other, making it a non-probabilistic binary linear classifier in which the model represents examples as points in space that are mapped so that the examples of the separate categories are divided by a gap to allow new examples, such as input matrix, to be mapped on the same space and predicted to belong to a category based on which side of the gap they fall), extreme learning machine (e.g., a feedforward neural network for classification or regression that include one or more layers of hidden nodes, where the parameters of the hidden nodes need not be tuned, and is based on an empirical risk minimization function whose learning process can be performed in a single iteration that avoids multiple iterations and local minimization), or a neural network (e.g., a collection of connected units or nodes that process input signals based on a non-linear function of the sum of the inputs, and provide output signals to another node in another layer, where the connections between nodes are edges that can have a weight that adjusts as the learning proceeds).

The machine learning model generator 214 can receive, as input, the input matrix generated by the input matrix generator 212. The machine learning model generator 214 can generate a machine learning model using one or more machine learning techniques, and store the model in the model data structure 224 in data repository, or otherwise manage or maintain the model. The machine learning model generator 214 can be configured to generate and train the initial model based on initial training data sets that may be weighted. The machine learning model generator 214 can use a historical input matrix (e.g., generated from historical signals and historical statistical metrics determined from the historical signals) to train the machine learning model. Once trained, the model can be used to predict new outputs using a new input matrix.

Thus, the data processing system 202 can input the input matrix into a machine learning model constructed to output a value for a signal of the utility grid based on the input matrix. The output value can be for a future time period. For example, a future time period can refer to a timestamp that is not included in the input matrix (e.g., in Table 1, the future timestamp can be to +5). Thus, the data processing system 202 can predict a value for one or more signals in the future.

In another example, the data processing system 202 can predict values for a time period in the input matrix, but for a signal that does not have a value in the input matrix. For example, the input matrix may be incomplete or missing a value for a signal at one or more timestamps. The input matrix may be missing the signal due to the signal value being corrupted or invalid at that timestamp and removed by the pre-processor 206. The pre-processor 206 can remove the signal value at the timestamp due to failing an error check or validation process, but the model machine learning model generator 215 can predict the value using valid signal samples that occur prior to, or subsequent to, the removed signal sample. Thus, the data processing system 202 can feed the input matrix into the machine learning model trained to predict the corresponding output matrix. This allows the data processing system 202 to predict outputs when data is temporarily unavailable, or allows the data processing system 202 to predict changes in the output that would occur. Thus, the data processing system 202 can predict, based on the input matrix and via the machine learning model, a value for the signal of the utility grid 100 at a time period for which the value is not provided in the input matrix (either a future value or a current value that is missing from the input matrix).

The data processing system 202 can predict changes to output based on adjusting input signals. The data processing system 202 can adjust input signals to control the behavior of the utility grid 100 or optimize a performance or functionality of the utility grid 100. The data processing system 202 can include a circuit optimizer 216 designed, constructed and operational to identify changes to signals or values to realize an optimal or desired performance of the utility grid 100. The circuit optimizer 216 can use the machine learning model generated by the machine learning model generator 214 to predict behavior of the utility grid 100 based on adjusting input signals. The circuit optimizer 216 can adjust input signals to generate a simulated input matrix (e.g., via the input matrix generator 212). The circuit optimizer 216 can input the simulated input matrix into the machine learning model to predict or determine output values.

The circuit optimizer 216 can be configured with one or more rules, policies, or logical expressions to optimize a parameter or behavior of the utility grid 100 in order to improve the efficiency or reliability of power distribution and delivery. For example, the circuit optimizer 216 can be configured to facilitate Volt/VAR optimization and voltage management; system-state prediction, optimization and controls under various distributed energy resource scenarios (e.g., photovoltaic power generation, wind power generation, or electric vehicle penetration); fault, location, isolation, and system restoration; anti-islanding detection; or verification of the sequence and control of automatic switching, voltage control, and protection system operations.

The circuit optimizer 216 can be configured to perform Volt/VAR optimization ("VVO") and voltage management. VVO can refer to a process of optimally managing voltage levels and reactive power to achieve more efficient gird operation by reducing system losses, peak demand or energy consumption or a combination of the three. During the process, the data processing system 202 (e.g., via grid controller 218) can control voltage control devices at a substation 104 and on the utility grid 100 circuit to reduce the voltage drop from the substation 104 to the end of the line (e.g., primary circuit 112 or secondary circuit 116) and reduce the service voltage to customers sites 119a-n while maintaining the voltage within defined limits. The efficiency gains can be realized from a reduction in the system voltage, which can result in less energy being consumed by end-use equipment served by the utility grid 100. To determine the voltage level that can be set, the circuit optimizer 216 can generate a simulated input matrix with, for example, a change to a voltage or tap setting at the substation 104 to determine the impact the change to the voltage or tap setting has on signals at other locations in the utility grid 100. The circuit optimizer 216 can also account for general signals, such as time of day, weather, or transmission resources. Using the machine learning model, the circuit optimizer 216 can determine whether the predicted output for a signal falls within a desired range. For example, the circuit optimizer 216 can continually lower the voltage at the substation 104 by adjusting the tap setting to determine whether desired voltages at other locations in the utility grid 100 meet a minimum desired voltage (e.g., 120V at the customer site 119a), taking into account other signals such as time of day, predicted consumption for the time of day, etc. Thus, the circuit optimizer 216, using the model, can determine a signal at the substation that facilitates VVO, and provide the value to the grid controller 218 to generate one or more commands to instruct one or more devices on the utility grid 100 to realize the predicted value to facilitate VVO.

Figure 3:
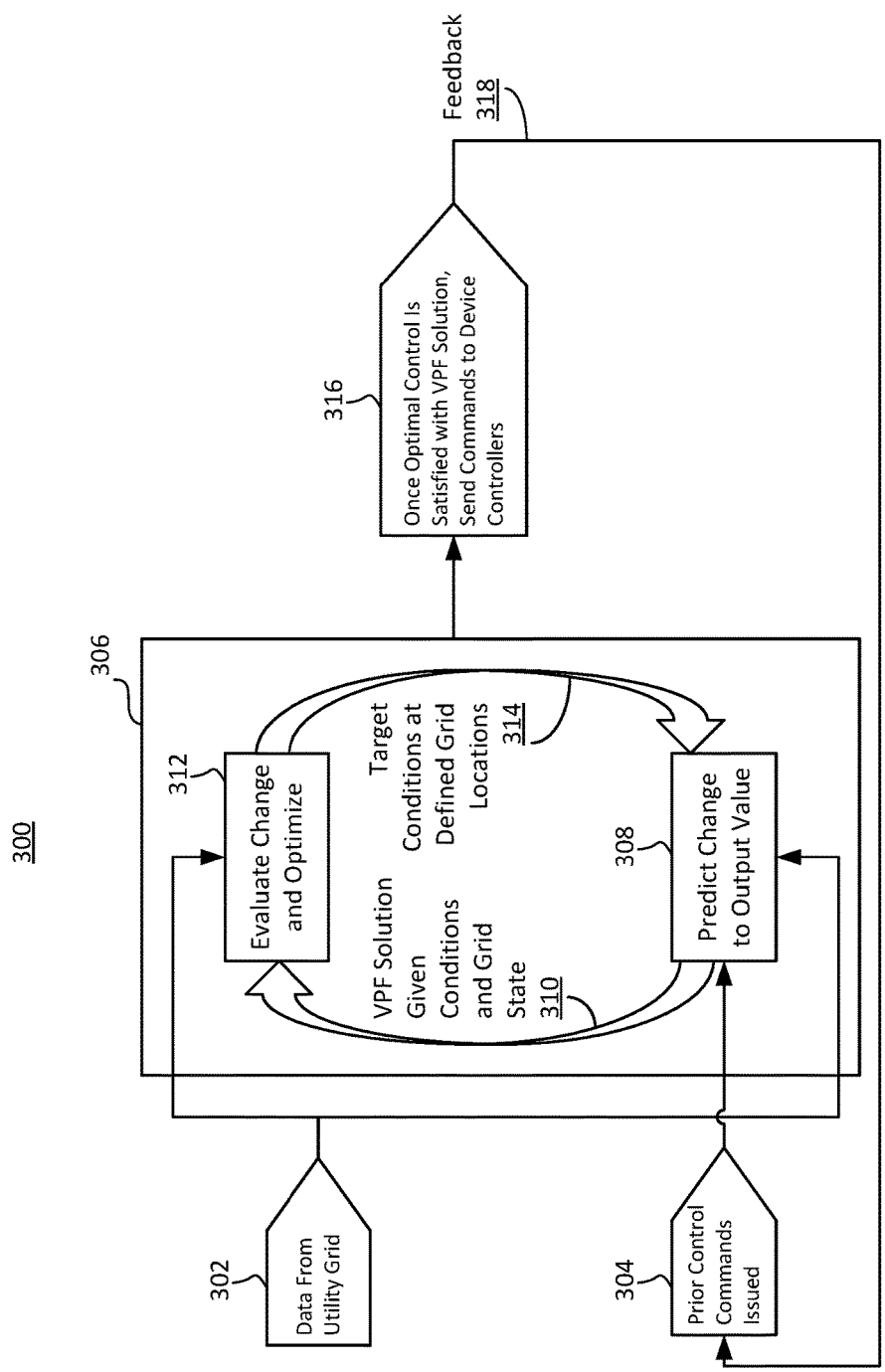
FIG. 3 is a flow diagram depicting operation of a system for controlling components in a utility grid, in accordance with an implementation.

The circuit optimizer 216 can predict the state of the system under various distributed energy resource scenarios, (e.g., photovoltaic power generation, wind power generation, or electric vehicle penetration). To do so, the circuit optimizer 216 can adjust an input signal that indicates a resource scenario (e.g., photovoltaic power generation indicated by a solar inverter device located on the primary circuit and a signal indicating power generated by the solar inverter on the primary circuit. By changing the value for the signal, the circuit optimizer 216 can determine how it impacts voltage levels, for example, at other locations on the utility grid 100. Further, the circuit optimizer 216 can increase the signal indicating power generated by the solar inverter device, while adjusting a signal indicating a tap setting at the substation, for example, to determine the impact on voltage levels at various locations in the utility grid 100. By doing so, the circuit optimizer 216 can determine that, during solar power generation, the voltage level can be reduced at the substation 104 to a predicted level, while maintaining desired voltage levels throughout the utility grid 100. The data processing system 202 can perform this optimization in real-time based on a real-time input matrix received via interface 204, or simulate the input matrix to predict what condition may allow for signal adjustment and control. The circuit optimizer 216 can use the machine learning model to optimize the voltage and VAR levels on a circuit for a goal (e.g., reduced energy usage, stability during intermittent renewable generation etc.) as depicted in FIG. 3.

The data processing system 202 can determine when faults may occur on the utility grid 100, such as due to excess power usage during peak energy consumption (e.g., brownouts due to increased air conditioning use, or increased electric vehicle charging). The data processing system 202 can detect that such a fault is imminent based on detecting a trend in the input matrix using the machine learning model, and pre-emptively adjust signals of the utility grid 100 by generating commands to devices on the utility grid 100.

The data processing system 202 can predict, using the model and simulated input matrices, how to restore the utility grid 100 subsequent to a fault. For example, the data processing system 202 can determine what value for a signal would effectively restore the utility grid 100 without resulting in another imminent fault, and cause the grid controller 218 to generate control signals to achieve the desired result. To do so, the data processing system 202 can simulate input matrices further out in time based on trends in the input matrix that results in the fault in the first instance. The simulated input matrices may prioritize avoidance of a fault during a restoration time period (e.g., 10 minutes, 15 minutes, 20 minutes, 30 minutes, 1 hour, etc.), as opposed to VVO, in order to restore the utility grid 100. Thus, during a restoration phase, the circuit optimizer 216 can disable or decrease the weight of signals for VVO goals, while increasing the weights for signals for fault avoidance.

The data processing system 202 can perform anti-islanding detection, which can refer to a condition in which a distributed generator (e.g., a gas power generator or solar inverter device on the utility grid 100) continues to power a location even though electrical grid power is no longer present. This can lead to safety hazards, as well as an imbalance between load and generation in the islanded circuit, potential resulting in abnormal frequencies and voltages. The data processing system 202, using the machine learning model and an input matrix, can detect when such islanding may occur based on predicting output values for signals such as frequency and voltage. The data processing system 202 can determine, based on a comparison between a frequency and a voltage with a threshold, or via a classification of the output matrix, whether to classify the predicted output variables or signals as an instance of islanding. For example, the data processing system 202, using the machine learning model, can include an output signal in the output matrix that corresponds to a classification of islanding (e.g., binary classification indicating whether islanding is present, or not present, or a likelihood that islanding is present, or a confidence score associated with the binary classification). The data processing system 202 can predict islanding based on predicted output signals, or an output matrix generated via the machine learning model can include an islanding classification signal or variable.

The data processing system 202 can use the machine learning model to verify behavior of the utility grid 100. For example, the data processing system 202 can predict output values based on simulated input matrixes. The data processing system 202 can generate a simulated input matrix, and then predicted an output matrix via the machine learning model and the simulated input matrix. The data processing system 202 can then receive a real-time signals to generate a real-time input matrix and determine whether the values in the input matrix match with the simulated or predicted values. Matching can be exact match, or match within a tolerance, such as predetermined percentage (e.g., 1%, 2%, 3%, 4%, 5% or some other percentage) or other range. If the real-time measured do not match the predicted signals, then the data processing system 202 can determine that the behavior of the utility grid 100 may be anomalous. The data processing system 202 can determine the anomalous behavior may be the result of a faulty device on the utility grid 100, or other fault, failure or attack on the utility grid 100.

Thus, the data processing system 202 can predict, via the input matrix and the machine learning model, changes to signals associated with components (or devices) of the utility grid 100. The data processing system 202 (e.g., via circuit optimizer 216) can evaluate the changes to identify a desired outcome for the utility grid 100. The data processing system 202 (e.g., via grid controller 218) can generate one or more commands to control one or more of the components to achieve the desired outcome for the utility grid 100. The data processing system 202 can compare the value for the signal of the utility grid 100 predicted by the circuit optimizer 216 via the machine learning model with a threshold, and generate the command to control the component on the utility grid 100 based on the comparison (e.g., adjust tap setting to increase or decrease voltage level).

The data processing system 202 can include a grid controller 218 designed, constructed and operational to generate commands to control a device or component on the utility grid 100. The grid controller 218 can receive an indication from the circuit optimizer 216 as to a desired change to a signal or value associated with a device or location on the utility grid 100. The grid controller 218 can access a commands data structure 226 stored in data repository 220 to determine a command to issue to one or more components or devices on the utility grid 100 that would result in the desired signal or value predicted by the circuit optimizer 216 via the machine learning model.

For example, the circuit optimizer 216 can predict that a tap position change would facilitate VVO. The grid controller 218 can receive, from the circuit optimizer 216, an indication of the desired tap position change and the device or component on the utility grid 100. The grid controller 218 can determine an address or identifier for the device. For example, the grid controller 218 can perform a lookup in commands data structure 226 or other data file to determine an internet protocol address of the device, or other address or unique identifier associated with the device.

The grid controller 218 can determine a protocol or format for commanding the device. For example, using the commands data structure 226, the grid controller 218 can perform a lookup using information about the type of device (e.g., obtained based on the device identifier or otherwise obtained from the circuit optimizer 216) to determine a format, protocol, or structure for the command. The grid controller 218 can use one or more rules, or logic statements to construct the command. The grid controller 218 can use a template to construct the command. The template can be retrieved from the data repository 220 (e.g., from commands data structure 226). The grid controller 218 can determine the desired change, and then populate the template to generate a command. The grid controller 218 can transmit the command to the device via interface 204 and network 140. Thus, the grid controller 218 can provide a command to control a component of the utility grid 100 responsive to the value for the signal of the utility grid 100 predicted by the machine learning model and via the circuit optimizer 216.

Subsequent to the grid controller 218 controlling the component on the utility grid 100 with the command, the data processing system 202 can receive additional signals in real-time. The data processing system 202 can evaluate or process the received input signals, which are a result of the command provided by the grid controller 218. The data processing system 202 (e.g., the machine learning model generator 214) can update or train the machine learning model based on the command and the received signals.

The grid controller 218 can generate and provide alerts, notifications, reports or other information to facilitate operation, management or maintenance of the utility grid 100. For example, instead of, or in addition to, transmitting a control command to a device on the utility grid 100, the grid controller can generate an instruction, report, alert or other notification of a predicted output condition. An administrator of the utility grid 100 or data processing system 202 can receive the report (e.g., via network 140) and take an action to manage or maintain the utility grid 100. For example, the report or notification can indicate that a device on the utility grid 100 is nearing failure or has failed. The administrator of the utility grid 100, responsive to the notification, can replace or repair the device. In some cases, the grid controller 218 can automatically disable the failed or failing device using a control command. Types of control commands can include, for example, activating or deactivating a device, changing a parameter of the device, setting a parameter of the device, adjusting operation of the device, disabling or turning off a device, executing a diagnostic check on a device, or requesting information from the device.

Referring now to FIG. 3, a flow diagram depicting operation of a system for controlling components in a utility grid, in accordance with an implementation, is shown. The flow diagram 300 can represent operation of a system, such as utility grid 100 depicted in FIG. 1 or the system 200 depicted in FIG. 2, or one or more component thereof. For example, aspects of the flow 300 can be performed by a data processing system, input matrix generator, circuit optimizer, machine learning model generator, grid controller, or utility grid. The flow 300 can include receiving data from the utility grid at ACT 302 and prior commands at ACT 304. At ACT 306, the data processing system can iterate through an optimization process, which can include, at ACT 308, predicting a change to an output value based on the utility grid data and prior commands. At ACT 310, the predicted change is provided. At ACT 312, the data processing system can evaluate the change determine how to optimize a goal. At ACT 314, the optimization signals are provided. The flow 306 can iterate one or more times until optimum conditions are detected. At ACT 316, the optimal control is provided to the utility grid. At ACT 318, feedback can be provide back to the iterative flow 306 via ACT 304. In this illustrative example, flow 306 depicts a closed optimization loop used to issue commands to grid devices. Other flows can be used to provide optimization, such as linear flows.

Still referring to FIG. 3, and in further detail, at ACT 302 real-time data from grid devices can be ingested. Real-time data can refer to measurements made by devices on the utility grid, and transmitted to a data processing system. The data processing system can receive the real-time measurements via a network. The data processing system can receive the measurements based on a time interval or batch upload. The measurements can be in one or more formats, units, or types. Utility grid data can refer to, or include, timestamps and signals associated with various devices on the utility grid. The utility grid data can include an indication or identifier of the device from which the measurement is obtained. Utility grid data can include location information for the device.

At ACT 304, prior commands can be input into the iterative flow 306. If no prior commands were issued, then prior commands may not be provided or received by the data processing system. Prior commands can refer to any prior commands, whether or not they were provided by the data processing system. Prior commands, for example, may be provided by other control systems associated with the utility grid, or administrators thereof. Prior commands may not be available if, for example, they are not associated with a current time period for which the utility grid data is provided.

During iterative process 306, the data processing system ingests utility grid data (received via ACT 302) and any prior commands (received via ACT 304). At ACT 308, the data processing system (e.g., using a machine learning model) can predict changes to an output value based on the input values. The data processing system can generate an input matrix based on data from ACTS 302 and 304, and feed the input matrix to a machine learning model to generate or predict a change to an output.

At ACT 310, the predicted change can be provided. The change can be referred to as a solution based on given conditions and state of the utility grid based on the utility grid data and prior control commands. For example, a virtual power flow model (e.g., a machine learning model) can be used by the data processing system to predict the change in grid conditions for a given set of device changes. These changes can be sent, via ACT 310, to an optimizer process which evaluates the changes in grid conditions against the desired outcome at ACT 312. The optimizer process 312 can evaluate the change to determine whether to make further adjustments to facilitate a desired outcome, such as VVO. The data processing system can further simulate a change by adjusting a parameter based on a target condition at the defined grid location or device, and provide the changed signal value to the machine learning model via ACT 314. At ACT 308, the data processing system can again predict the change based on the changed input signal value.

This process 306 is iterated until an optimal set of changes is obtained, which are then sent to the grid devices at ACT 316. Once the optimal control is satisfied (e.g., based on VVO being achieved), the data processing system can send the commands to device controllers or devices on the utility grid. The devices on the grid can modify their operation based on the change. The issued commands can be fed back (e.g., via feedback ACT 318) into the such that their effects on the grid are learned (e.g., via ACT 304).

One or more portions of the flow 300 can be performed by a centralized system, such as a data processing system. In some cases, one or more portions of the flow can be performed by local data processing systems. For example, one or more local devices on the utility grid can be configured with one or more component or functionality of the data processing system, and perform such functionality. The one or more local devices can include local machine learning models, and use the local machine learning model to predict a change or output. The local predictions can be provided to a centralized data processing system for further processing and control.

Figure 4:
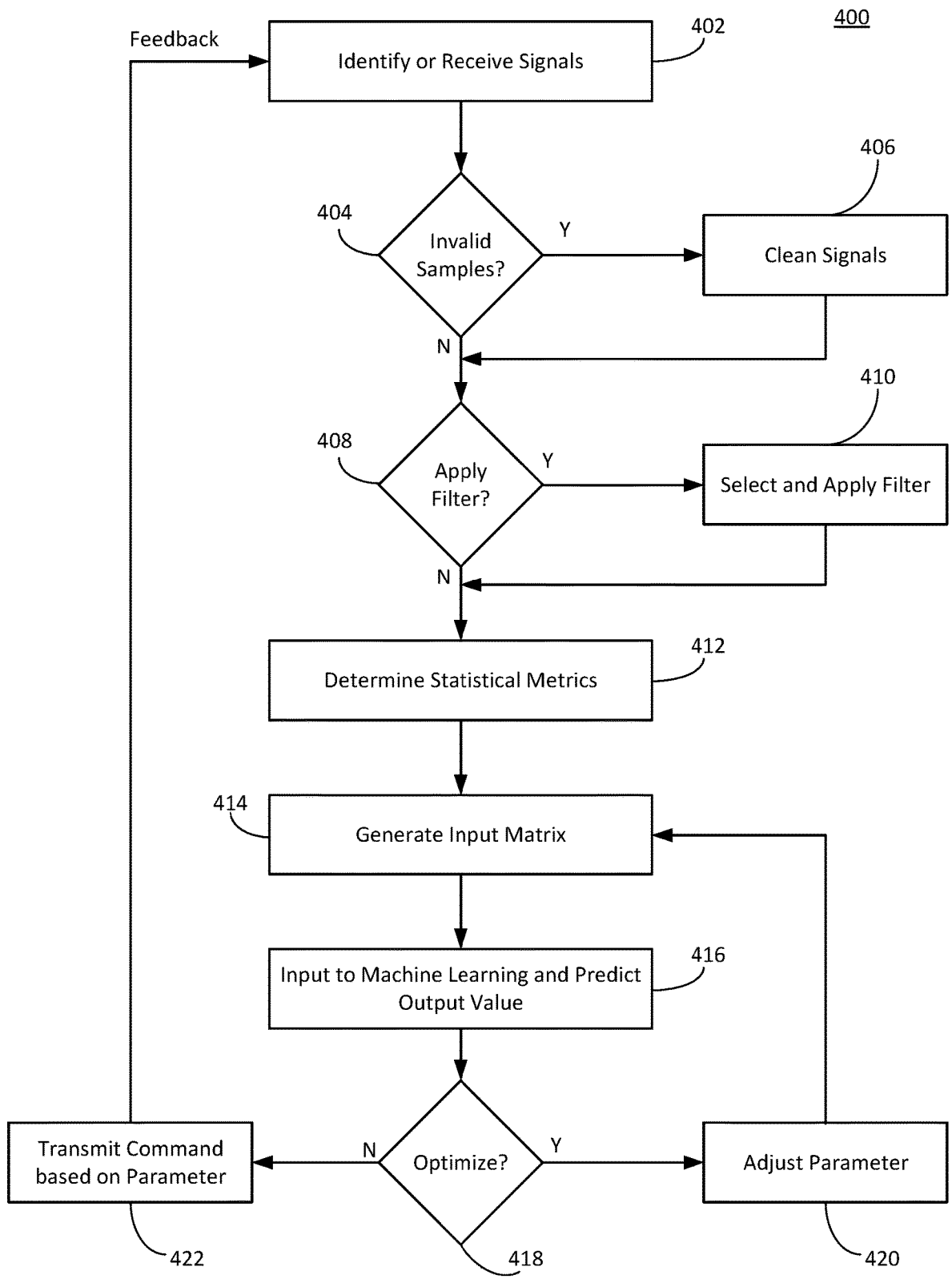
FIG. 4 is a flow diagram depicting an example of a method of controlling component in a utility grid, in accordance with an implementation.

FIG. 4 is a flow diagram depicting an example of a method of controlling component in a utility grid, in accordance with an implementation. The method 400 can be performed by one or more system or component depicted in FIGS. 1 and 2, including, for example, a data processing system or a utility grid.

The method 400 can include identifying or receiving signals at ACT 402. A data processing system can receive or identify signals via a real-time data feed or stream. Signals can refer to or include utility grid data, such as characteristics of electricity, device settings, device operation modes, or weather conditions. Signals can be obtained from various sources, such as from different devices at different locations on the utility grid, or an external server or other data sources.

At decision block 404, the data processing system can determine whether there are any invalid samples. The data processing system can identify invalid samples based on comparing sampling values to thresholds, detecting noise, detecting corrupted samples, or detecting missing or null samples. The data processing system can determine whether signals received from various devices are in synchronicity with one another. If the data processing system detects invalid samples or out synch samples, the data processing system can proceed to ACT 406 to clean the signals.

At ACT 406, the data processing system can clean the signals using one more data cleaning techniques. The data processing system can remove invalid samples. Removing invalid samples can include removing a sample from each signal corresponding to the timestamp having the invalid sample. However, in some cases, the data processing system can remove only the invalid sample, as opposed to the other valid samples for the same timestamp, in order to predict the value of the invalid sample using a machine learning model.

Upon cleaning the sample at ACT 406, the data processing system can proceed to decision block 408. The data processing system can proceed to decision block 408 if, at decision block 404, the data processing system determined that there were no invalid samples. At decision block 408, the data processing system can determine whether to apply a filter. The data processing system can apply a filter if the data processing system determines that the accuracy or reliability of a prediction can be improved by filtering the input data (e.g., based on detecting frequencies that are determined to have a negative impact, such as a low frequency, or detecting volatility or noise in the data).

If the data processing system determines, at decision block 408, to apply a filter, the data processing system can proceed to ACT 410 to select and apply a filter. The data processing system can select a filter based on characteristics of the utility grid data, such as sample rate, trends, noise characteristics, or detected unwanted frequencies. For example, the data processing system can select a low pass filter and a smoothness filter to remove noise while maintaining desired trends in the data.

Upon applying the filter to the data, the data processing system can proceed to ACT 412 to determine statistical metrics. The data processing system can proceed to ACT 412 if, at decision block 408, the data processing system determines not to apply a filter (e.g., the data quality is high and does not include unwanted noise or frequencies). At ACT 412, the data processing system can determine statistical metrics such as mean, median, minimum, maximum, standard deviation, mean difference, median difference, etc. The data processing system can determine the statistical metrics for a period of time or a predetermined period of time or a predetermined number of samples. The data processing system can determine the number of samples or period of time based on conditions or events associated with the data, such as faults, tap changes, voltages above or below a threshold, or other conditions.

At ACT 414, the data processing system can generate an input matrix. The data processing system can generate the input matrix including the received input signals and the determined statistical metrics. The data processing system can generate the input matrix with the synchronized, cleaned, and filtered utility grid data. The data processing system can generate the input matrix with rows and columns corresponding to time stamps and signal values, respectively. The size of the input matrix can correspond to a number of samples or time period determined based on a predetermined value, or dynamically determined based on conditions or events associated with the utility grid data. The data processing system can weight one or more rows (e.g., timestamps) in order to increase or decrease the importance of the signal values at the time stamp when generating or training the machine learning model.

At ACT 416, the data processing system can input the generated input matrix into a machine learning model and predict an output value. The data processing system can be configured to use one or more types of machine learning model. The data processing system can generate an output matrix based on the input matrix. The output matrix can include values for time period different from the time periods in the input matrix (e.g., a future output value). The output matrix can also fill in the missing values in the input matrix, for example, determine values for a signal that is missing from the input matrix.

At decision block 418, the data processing system can determine whether the optimize an aspect of operation or performance of the utility grid. The data processing system can determine to perform VVO, for example, or optimize some other aspect or characteristic of the utility grid. If the data processing system determines to optimize the utility grid, the data processing system can proceed to ACT 420 to adjust a parameter.

At ACT 420, the data processing system can adjust a parameter or value of a signal (e.g., a voltage at a location on the utility grid, or setting of a device at a location of the utility grid). The data processing system can provide the adjusted parameter and return to ACT 414 to generate a new input matrix. This input matrix can be referred to as a simulated input matrix because the data processing system adjusted a parameter prior to transmitting the parameter or a control command to a device to implement the adjusted the parameter. Thus, the data processing system can simulate how adjusting the parameter would impact the utility grid by re-performing ACTS 414 and 416 using an adjusted parameter from ACT 420. The data processing system can iterate through this loop one or more times.

The data processing system can determine that the performance has been optimized when returning to decision block 418. For example, the data processing system can determine that desired threshold have been met by the adjusted parameter, or the data processing system can determine that further adjustments are beginning to degrade the performance of the utility grid (e.g., tap change resulting in a voltage level at a location of the utility grid being below a minimum threshold).

At decision block 418, if the data processing system determines not to optimize the utility grid, or not to further optimize because the adjusted parameter was determined to result in optimum performance, the data processing system can proceed to ACT 422 to transmit a command. The data processing system can transmit a control command, instruction, notification, report, or alert based on the output value from ACT 416. The data processing system can provide the control command as feedback back to ACT 402, at which point the data processing system can received updated utility grid data, including real-time signals and other control commands, and continue predicting the behavior of the utility grid in order to evaluate or manage the utility grid, optimize performance of the utility grid.

Figure 5:
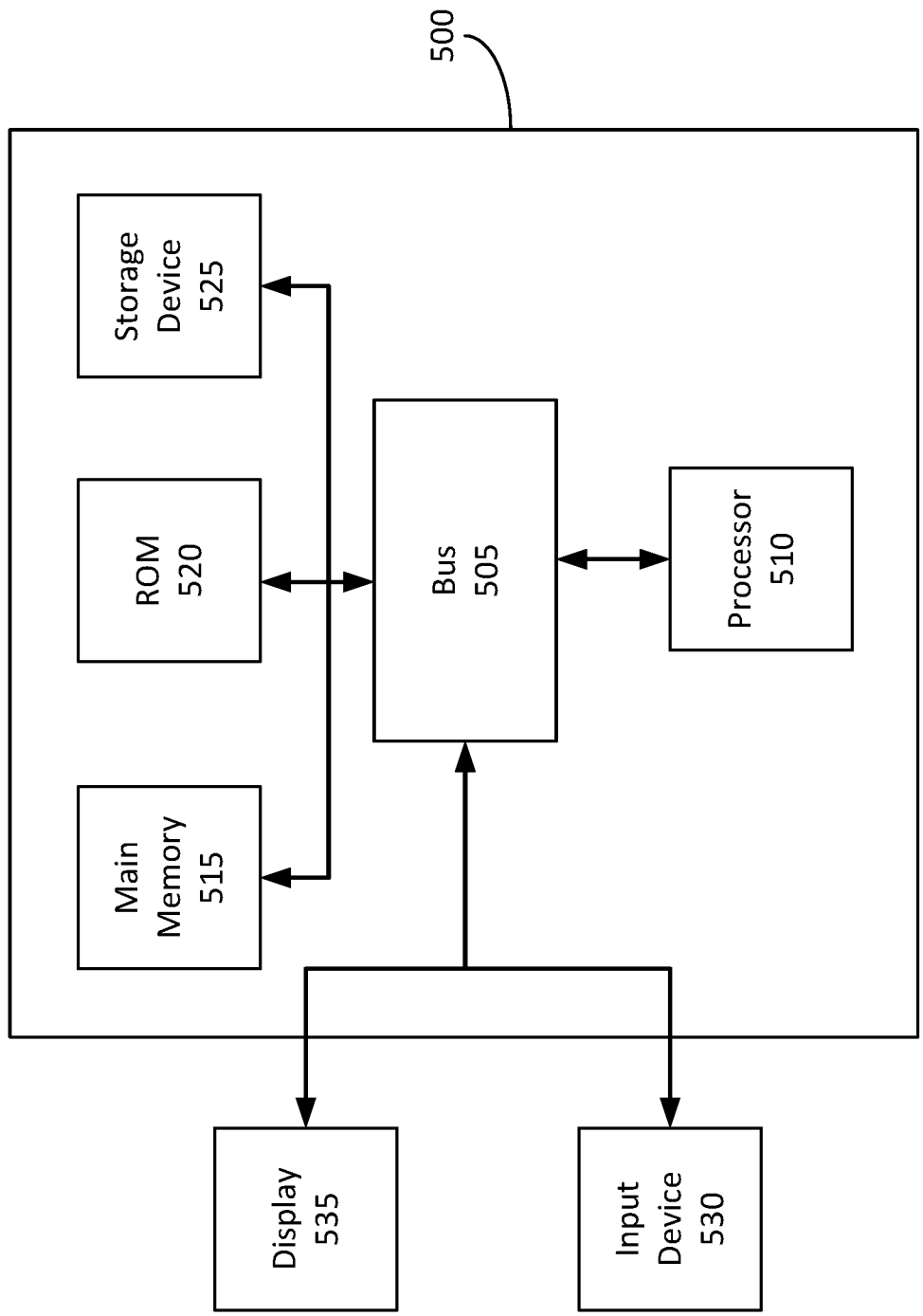
FIG. 5 is a block diagram illustrating an architecture for a computer system that can be employed to implement elements of the systems and methods described and illustrated herein, including, for example, aspects of the utility grid depicted in FIG. 1, the system depicted in FIG. 2, the operations depicted in FIG. 3, and the method depicted in FIG. 4.

FIG. 5 is a block diagram of an example computer system 500. The computer system or computing device 500 can include or be used to implement the data processing system 202, or its components such as the data processing system 202. The computing system 500 includes at least one bus 505 or other communication component for communicating information and at least one processor 510 or processing circuit coupled to the bus 505 for processing information. The computing system 500 can also include one or more processors 510 or processing circuits coupled to the bus for processing information. The computing system 500 also includes at least one main memory 515, such as a random access memory (RAM) or other dynamic storage device, coupled to the bus 505 for storing information, and instructions to be executed by the processor 510. The main memory 515 can also be used for storing position information, utility grid data, command instructions, device status information, environmental information within or external to the utility grid, information on characteristics of electricity, or other information during execution of instructions by the processor 510. The computing system 500 may further include at least one read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions.

The computing system 500 may be coupled via the bus 505 to a display 535, such as a liquid crystal display, or active matrix display, for displaying information to a user such as an administrator of the data processing system or the utility grid. An input device 530, such as a keyboard or voice interface may be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 202, or other component of FIG. 1.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., arbitration component), and the positioning component 105 and map data illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method, comprising:
   identifying, by one or more processors, a first plurality of signals detected by one or more devices located at one or more portions of a grid, and a second plurality of signals received from a server remote from the grid;
   determining, by the one or more processors, one or more metrics from the first plurality of signals and the second plurality of signals over a first time period;
   generating, by the one or more processors, an input matrix having a first dimension corresponding to timestamps, and a second dimension corresponding to the first plurality of signals, the second plurality of signals, and the one or more metrics;
   inputting, by the one or more processors, the input matrix into a machine learning model constructed to output a value for a signal of the grid based on the input matrix;
   determining, by the one or more processors based on the input matrix and via the machine learning model, the value for the signal of the grid at a second time period for which the value is not provided in the input matrix; and
   providing, by the one or more processors, a command to control a component of the grid responsive to the value for the signal of the grid predicted by the machine learning model.

2. The method of claim 1, wherein the grid is configured to distribute a utility.

3. The method of claim 1, wherein the grid is configured to distribute electric power.

4. The method of claim 1, wherein the grid comprises a power source.

5. The method of claim 1, wherein the grid is coupled to a second grid comprising a power source, and the grid receives power from the power source via the second grid.

6. The method of claim 1, wherein the second plurality of signals include a price signal.

7. The method of claim 1, wherein the second plurality of signals include at least one of a current cost of electricity or a forecasted cost of electricity.

8. The method of claim 1, wherein:
   the first plurality of signals include:
      substation signals corresponding to at least one of a voltage regulator, a load tap changer, a substation meter, a digital relay, or a circuit breaker;
      primary circuit signals corresponding to at least one of a primary circuit meter, capacitor bank, primary circuit voltage regulator, line voltage monitor, primary solar inverter; and
      secondary circuit signals corresponding to at least one of a secondary solar inverter, an electric vehicle charging point, a residential electric meter, or data from an electronic device located at a customer location; and
   the second plurality of signals include at least one of a current weather, a forecasted weather, or a price signal.

9. The method of claim 1, comprising:
   training, by the one or more processors, the machine learning model using a historical input matrix generated from historical signals and historical statistical metrics.

10. The method of claim 1, comprising:
    comparing the value for the signal of the grid predicted by the machine learning model with a threshold; and
    generating the command to control the component based on the comparison.

11. A system, comprising:
    one or more processors coupled with a non-transitory computer readable medium to:
    identify a first plurality of signals detected by one or more devices located at one or more portions of a grid, and a second plurality of signals received from a server remote from the grid;
    determine one or more metrics from the first plurality of signals and the second plurality of signals over a first time period;
    generate an input matrix having a first dimension corresponding to timestamps, and a second dimension corresponding to the first plurality of signals, the second plurality of signals, and the one or more metrics;

input the input matrix into a machine learning model constructed to output a value for a signal of the grid based on the input matrix;

determine, based on the input matrix and via the machine learning model, the value for the signal of the grid at a second time period for which the value is not provided in the input matrix; and provide a command to control a component of the grid responsive to the value for the signal of the grid predicted by the machine learning model.

12. The system of claim 11, wherein the grid is configured to distribute a utility.

13. The system of claim 11, wherein the grid is configured to distribute electric power.

14. The system of claim 11, wherein the grid comprises a power source.

15. The system of claim 11, wherein the grid is coupled to a second grid comprising a power source, and the grid receives power from the power source via the second grid.

16. The system of claim 11, wherein the second plurality of signals include a price signal.

17. The system of claim 11, wherein the second plurality of signals include at least one of a current cost of electricity or a forecasted cost of electricity.

18. The system of claim 11, wherein:
the first plurality of signals include:
substation signals corresponding to at least one of a voltage regulator, a load tap changer, a substation meter, a digital relay, or a circuit breaker;
primary circuit signals corresponding to at least one of a primary circuit meter, capacitor bank, primary circuit voltage regulator, line voltage monitor, primary solar inverter; and
secondary circuit signals corresponding to at least one of a secondary solar inverter, an electric vehicle charging point, a residential electric meter, or data from an electronic device located at a customer location; and
the second plurality of signals include at least one of a current weather, a forecasted weather, or a price signal.

19. The system of claim 11, wherein the one or more processors are further configured to:
train the machine learning model using a historical input matrix generated from historical signals and historical statistical metrics.

20. The system of claim 11, wherein the one or more processors are further configured to:
compare the value for the signal of the grid predicted by the machine learning model with a threshold; and
generate the command to control the component based on the comparison.

* * * * *